United States Patent
Liu et al.

(10) Patent No.: US 12,002,122 B2
(45) Date of Patent: Jun. 4, 2024

(54) LEGAL RESEARCH RECOMMENDATION SYSTEM

(71) Applicant: Thomson Reuters Enterprise Centre GmbH, Zug (CH)

(72) Inventors: Xiaomo Liu, Forest Hills, NY (US); Xin Shuai, Inver Grove Heights, MN (US); Quanzhi Li, Mountainside, NJ (US); Eric Milles, Oakdale, MN (US); Eric Holten, Apple Valley, MN (US); Matt Makosky, Eagan, MN (US); Tom Vacek, Minneapolis, MN (US); Steven Sidwell, Richfield, MN (US); Ryan Kelly, Minneapolis, MN (US); Matthew A. Surprenant, St. Paul, MN (US); Scott Francis, Prior Lake, MN (US); Mike Dahn, Farmington, MN (US); Armineh Nourbakhsh, Brooklyn, NY (US); Sameena Shah, White Plains, NY (US); Merine Thomas, Eagan, MN (US)

(73) Assignee: THOMSON REUTERS ENTERPRISE CENTRE GMBH, Zug (CH)

(*) Notice: Subject to any disclaimer, the term of this patent is extended or adjusted under 35 U.S.C. 154(b) by 344 days.

(21) Appl. No.: 15/934,917

(22) Filed: Mar. 23, 2018

(65) Prior Publication Data

US 2018/0276305 A1    Sep. 27, 2018

Related U.S. Application Data

(63) Continuation-in-part of application No. 15/693,212, filed on Aug. 31, 2017.

(Continued)

(51) Int. Cl.
*G06Q 50/18* (2012.01)
*G06F 16/93* (2019.01)
(Continued)

(52) U.S. Cl.
CPC ............. *G06Q 50/18* (2013.01); *G06F 16/93* (2019.01); *G06F 16/9535* (2019.01);
(Continued)

(58) Field of Classification Search
USPC ........................................................ 705/311
See application file for complete search history.

(56) References Cited

U.S. PATENT DOCUMENTS

| 2008/0005101 A1* | 1/2008 | Chandra ............... G06F 16/951 |
| 2011/0060761 A1* | 3/2011 | Fouts ..................... G06F 40/10 |
| | | 707/E17.071 |

(Continued)

FOREIGN PATENT DOCUMENTS

WO    WO-2016076915 A1 *  5/2016  ........... G06F 16/951

OTHER PUBLICATIONS

Raghav, K., P. Krishna Reddy, and V. Balakista Reddy. "Analyzing the extraction of relevant legal judgments using paragraph-level and citation information." AI4JC Artificial Intelligence for Justice (2016): 30. (Year: 2016).*

*Primary Examiner* — Michael Young
(74) *Attorney, Agent, or Firm* — Alston & Bird LLP

(57) ABSTRACT

The present disclosure is directed towards systems and methods for assisting with legal research and for aiding in the discovery of information and documents relevant to a user's research focus or input text. The inventive systems receive identifications of relevant documents explicitly or implicitly from a user's research session or input text and, based on issues relevant to those documents, texts and other connections to those documents and texts, recommends (Continued)

similar or helpful documents to the user for their consideration. Recommendations may be ranked and filtered.

20 Claims, 32 Drawing Sheets

Related U.S. Application Data

(60) Provisional application No. 62/475,394, filed on Mar. 23, 2017, provisional application No. 62/382,296, filed on Sep. 1, 2016.

(51) Int. Cl.
  *G06F 16/9535* (2019.01)
  *G06F 18/22* (2023.01)
  *G06F 18/2411* (2023.01)
  *G06F 40/205* (2020.01)
  *G06F 40/279* (2020.01)
  *G06Q 10/00* (2023.01)
  *G06V 10/74* (2022.01)
  *G06V 30/418* (2022.01)

(52) U.S. Cl.
  CPC .......... *G06F 18/22* (2023.01); *G06F 18/2411* (2023.01); *G06F 40/205* (2020.01); *G06F 40/279* (2020.01); *G06Q 10/00* (2013.01); *G06V 10/761* (2022.01); *G06V 30/418* (2022.01)

(56) References Cited

U.S. PATENT DOCUMENTS

| | | | | |
|---|---|---|---|---|
| 2012/0330946 | A1* | 12/2012 | Arredondo | G06F 16/24575 707/E17.014 |
| 2014/0006424 | A1* | 1/2014 | Al-Kofahi | G06F 40/169 707/754 |
| 2014/0236964 | A1* | 8/2014 | Dalessio | G06F 16/93 707/748 |
| 2016/0140447 | A1* | 5/2016 | Cohen | G06N 5/048 706/52 |
| 2016/0335257 | A1 | 11/2016 | Janssens | |
| 2016/0342599 | A1* | 11/2016 | Koutrika | G06F 16/9535 |
| 2016/0344828 | A1 | 11/2016 | Hausler et al. | |
| 2017/0212882 | A1* | 7/2017 | Rollins | G06F 40/30 |

* cited by examiner

Fig. 7

Overview

We have two new legal research recommendation systems for Westlaw. One is based purely on documents a researcher has put into a folder (relying on processes 2 and 3 below). The other does the extra step of identifying relevant documents from interactions within a legal research session (some of which are specific to legal research) first before making recommendations relevant to the research based on the documents collected (relying on all 3 processes below).

Process 1: Relevant Document Collector

During a legal research session, this process identifies documents that the researcher signals as relevant. It examines document clicks, citation reports, printing, downloading, e-mailing, folder designations, user notations and highlighting, copying of passages for drafting, as well as time spent per document.

Process 2: Group Document Analyzer

Takes a given set of documents and analyzes them, looking for common legal issues, common citations, common rare words, and common usage patterns from other customer research sessions.

Process 3: Recommendation Engine

Once commonalities are identified, recommendations are made for additional documents that share some or all of these common items but have not been encountered yet in the research session. These recommendations include cases, statutes, and secondary sources.

Fig. 8

Recommendation Engines - Summary

- Track customer interactions with individual case opinion and statute documents, focusing on legal documents used during entire Westlaw research session or on all legal documents placed in the same Westlaw research folder.

- Weight stronger case law or statute usage like downloading or printing greater than simply viewing one of these legal documents

- Use the cases and statutes as input for algorithms that examine connections between those documents and how they connect to other candidate legal documents based on features that include West's Key Numbers, KeyCite citing and cited document relationships (including depth of treatment), KeyCite flag status, and aggregate customer legal research patterns

- Rank and threshold candidate case or statute documents or Key Number recommendations and display the most relevant candidates that have not been viewed during the session or not yet placed in the user's Westlaw research folder

- Folder analysis also organizes both the user's previously foldered documents and the recommended new documents by legal issue and leverages another process to map each legal issue to a label based on modified titles from Thomson Reuters secondary source article

Client Situation:

Employee quits and takes copies of customer emails.

Employer has called to ask what the legal options are and would like an answer today.

Recommendations for the Research Session

Fig. 13

WESTLAW

U.S. Gypsum Co. v. LaFarge No.
United States District Court, N.D. Illinois, E.

Document
Return to list    1 of 24 results
Part    1    1 of 2

Adhered to in Part on Reconsiderat

Original image of 5 M F.Supp 2d 601 (P)

Research Recommendations

▶ Why are these my results?

INJUNCTION
212k--1384 TRADE OR BUSINESS - Disclosure or use of trade secrets or confidential information

ANTITRUST AND TRADE REGULATION
○ 29T---413 IN GENERAL - What are "trade secrets" or other protected proprietary information, in general
○ 29T---421 IN GENERAL - Customer lists and information
○ 29T---414 IN GENERAL - Elements of misappropriation
○ 29T---420 IN GENERAL - Particular cases, in general

Cases | Statutes

☐ Select all items   No items selected

○ 1. Covenant Aviation Security, LLC v. Berry
United States District Court, N.D. Illinois, Eastern Division. February 11, 2014   15 F.Supp.3d 813   2014 WL 537446

Background: Limited liability company (LLC) brought action against its former president for breach of contract, misappropriation of trade secrets in violation of the Illinois Trade Secret Act (ITSA), and breach of fiduciary duty. Defendant moved to dismiss for failure to state a claim. Holdings: The District Court, Joan H. Lefkow, J.

▶ Synopsis

○ 2. System Development Services, Inc. v. Haarmann
Appellate Court of Illinois, Fifth District. April 13, 2009   389 Ill.App.3d 561   907 N.E.2d 63

COMMERCIAL LAW - Trade Secrets. Information contained in current and potential client list of provider of computer network services was not a trade secret.

▶ Synopsis

○ 3. Stampede Tool Warehouse, Inc. v. May
Appellate Court of Illinois, First District, Third Division. March 22, 1995   272 Ill.App.3d 580   651 N.E.2d 209

Trade Secrets: Tool distributor's customer list was trade secret which former employee misappropriated through memorization.

Synopsis
Background: Patent owner brought infringement of patent and violation

---

*This feature can recommend relevant additional legal resources such as Key Numbers, cases, statutes, secondary sources, and regulations.*

Recommendations for Folders

WESTLAW | All Content

Enter terms, citations, databases, anything

All State & Federal

Legal Issue

What constitutes "authorization or consent" within meaning of 28 U.S.C.A. § 1498(a) making suit a...

▓ Foldered Cases  ▓ Recommended

What constitutes "authorization or consent" within meaning of 28 U.S.C.A. § 1498(a) making suit against United States a patent owner's remedy where invention is used or manufactured with government's "authorization or consent"

Recommended Documents (10)

☐ Select all items | 0 items selected

☐ 1. Hutchinson Industries Inc. v. Accuride Corp.
United States District Court, D. New Jersey.  March 30, 2010  Not Reported in F.Supp.2d  2010 WL 1379720

Plaintiffs Hutchinson Industries, Inc. and Hutchinson S.A (collectively, "Plaintiffs") are holders of U.S. Patent No. 6,474,383 (the "383 patent"), which describes an automotive wheel with an internal valve system. In the instant suit, Plaintiffs allege that Defendant Accuride Corp. ("Defendant") infringed on their 383 patent. Specifically, Plaintiffs allege that Defendant has made or had others make the allegedly infringing wheel, and that Defendant has offered for sale or sold the wheel within the United States. Defendant moves to dismiss, or in the alternative for summary judgment on, all counts of Plaintiffs' complaint. Defendant submits that its wheel was manufactured solely for the United States Government ("Government") with its authorization and consent, placing the alleged infringing conduct within the scope of 28 U.S.C. § 1498, and that Defendant is thereby immune from suit in this patent infringement.

☐ 2. Madey v. Duke University
United States District Court, M.D. North Carolina.  January 31, 2006  413 F.Supp.2d 601  2006 WL 267187

PATENTS - Government Research. Fact issue existed as to whether university's patent infringement was authorized by government research grants.

☐ 3. Advanced Software Design Corp. v. Federal Reserve Bank of St. Louis
United States Court of Appeals, Federal Circuit.  September 30, 2009  583 F.3d 1371  2009 WL 3110804

Fig. 17

Westlaw Document Analysis

Analyzes Work Product
(and helps produce it)

Research is rarely useful by itself – it's typically done to produce documents for litigation or transactional work. Westlaw (and Drafting Assistant) will analyze draft and final documents to suggest better & counter authorities

LEGAL RESEARCH RECOMMENDATION SYSTEM

This application for letters patent disclosure document describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

CROSS-REFERENCE TO RELATED APPLICATIONS

This application is a continuation in part of U.S. patent application Ser. No. 15/693,212, filed Aug. 31, 2017, which claims the benefit of and priority to U.S. Provisional Application No. 62/382,296, filed Sep. 1, 2016, which are both hereby incorporated by reference in their entireties. This application also claims the benefit of and priority to U.S. Provisional Application No. 62/475,394, filed Mar. 23, 2017, which is hereby incorporated by reference in its entirety.

BACKGROUND

The present innovations generally relate to tools for recommending information to a document drafter based on the content of the document in progress as well as any citations in the drafted portion of the document to external pieces of information. The present innovations also generally address tools for recommending information to a researcher based on their research activities and previous research results.

Previously, in order to find information of interest relating to a particular subject, researchers were required to carefully craft search strategies for obtaining the information sought. In many cases, substantial skill and experience on the part of the researcher were needed in order to craft a search that would successfully and efficiently obtain the information sought. For example, a researcher's experience with information classification systems and even fore-knowledge of a document's exact contents were sometimes required in order to find some documents.

Accordingly, the new tools for finding relevant information presented herein will improve access to that information as well as make searching for the information quicker, more efficient and will yield a fuller, more reliable set of results than was previously possible.

In order to develop a reader's understanding of the innovations, disclosures have been compiled into a single description to illustrate and clarify how aspects of these innovations operate independently, interoperate as between individual innovations, and/or cooperate collectively. The application goes on to further describe the interrelations and synergies as between the various innovations; all of which is to further compliance with 35 U.S.C. § 112.

BRIEF SUMMARY

The present innovations generally address systems and methods for recommending research results in the legal research field.

In one aspect, a method for recommending research to a user of a computerized research system, comprises receiving an input text from a user, parsing the input text to identify ore or more issues relevant thereto, identifying recommendation candidates relevant to the one or more identified issues, and returning results of the identifying step, the results ranked according to a relevancy score indicating how relevant the results are to the input text.

In some implementations, the parsing step includes identifying issues based one or more formatting aspects of the input text.

In some implementations, the parsing step includes identifying any cites to other documents in the input text and identifying issues in the input text based on any issues known to be relevant to the identified cited documents.

In some implementations, the parsing step includes identifying any pincites to locations within other documents in the input text and identifying issues in the input text based on any issues known to be relevant to the identified pincited locations.

In some implementations, the method further comprises, if more than one issue is known to be relevant to an identified pincited location, determining which known issue is most relevant to the input text based on the context of the pincite in the input text.

In some implementations, the context includes a text of any blockquote relevant to the pincite in the input text.

In some implementations, the context includes the portion of the input text from the pincite to the previous pincite or the beginning of the input text, whichever is nearer to the pincite.

In some implementations, the method further comprises identifying one or more jurisdictions relevant to the input text and the context of a pincite includes the identified one or more jurisdictions.

In some implementations, the relevancy score is based at least in part on a similarity between each recommendation candidate and the input text.

In some implementations, the relevancy score is based at least in part on a similarity between each recommendation candidate and documents cited in the input text.

In some implementations, the similarity between each recommendation candidate and documents cited in the input text is determined at least in part by comparing a similarity between issues known to be relevant to each recommendation candidate and issues known to be relevant to the documents cited in the input text.

In some implementations, the method further comprises pre-filtering the results of the identifying step before returning them by only passing results having a higher relevancy score than a document cited in the input texts having a lowest relevancy score of all documents cited in the input text.

In some implementations, the pre-filtering step is configured to also pass a predetermined number of results having a lower relevancy score than the document cited in the input texts having the lowest relevancy score of all documents cited in the input text.

In some implementations, the relevancy score is based on an aggregation of two or more weighted sub scores, the sub scores including a jurisdiction score, an authority score, an issue similarity score, and a recency score.

In some implementations, the weighting of the sub scores is determined by an SVM model.

BRIEF DESCRIPTION OF THE DRAWINGS

The accompanying drawings illustrate various non-limiting, example, innovative aspects in accordance with the present descriptions:

FIG. 7 provides an overview of one example of a research recommendation system according to an exemplary embodiment.

FIG. 8 provides a summary of one example of a research recommendation system according to an exemplary embodiment.

FIGS. 9-15 provide an example of a client situation in which a research recommendation system according to an exemplary embodiment is employed.

FIGS. 16 and 17 provide an example in which a research recommendation system according to an exemplary embodiment is employed to provide research recommendations based on the contents of a logical folder.

FIG. 20 shows an example of a user interface according to an exemplary embodiment that presents results of analyzing input text.

FIG. 30 shows an example of a user interface of the inventive system according to an exemplary embodiment showing how analyzed input text, citations and document structure of the input document may be displayed to a user.

FIG. 31 shows an example of a user interface of the inventive system according to an exemplary embodiment showing how critical cases may be highlighted for the user to be aware of and if they desire to distinguish those critical cases.

FIG. 33 shows an example of a user interface of the inventive system according to an exemplary embodiment showing how the system may be configured to permit user input to change the jurisdiction that was determined to be applicable to a given issue.

DETAILED DESCRIPTION

Figure 1:
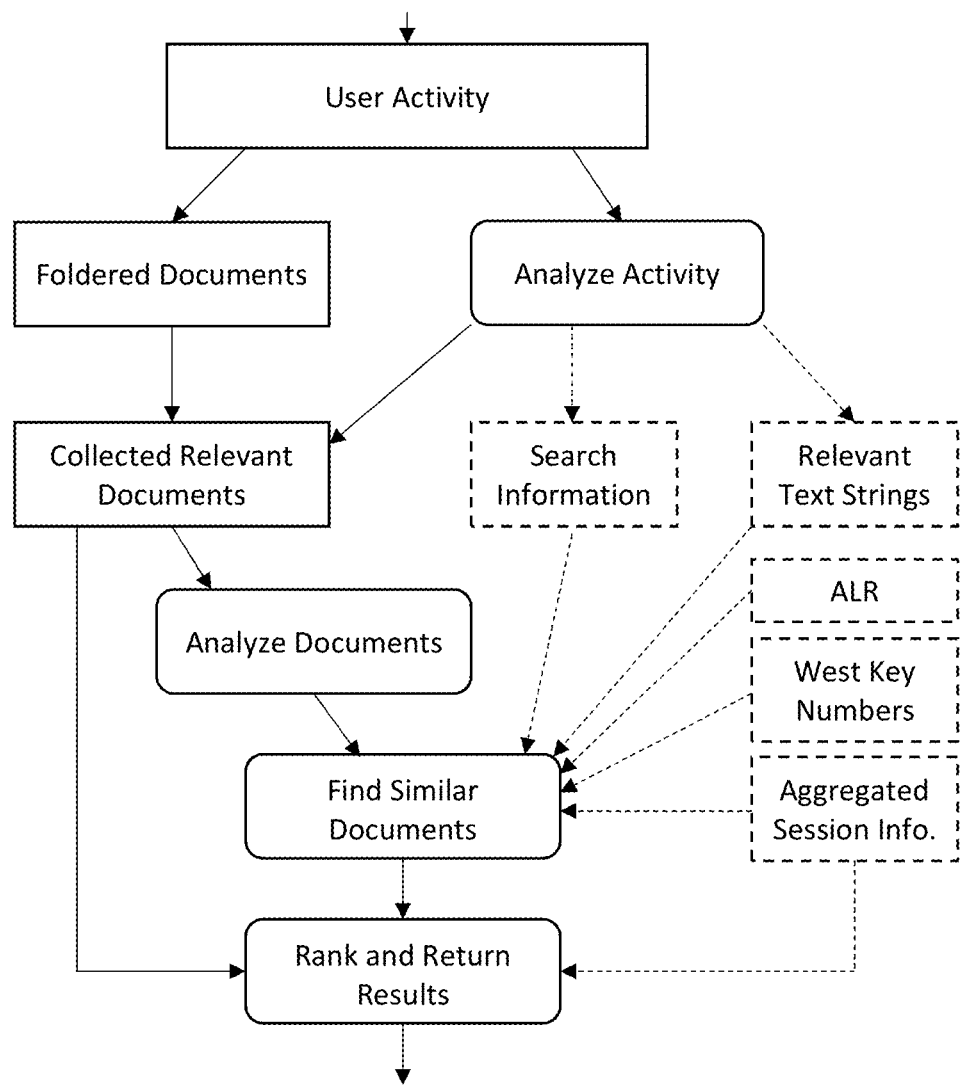
FIG. 1 shows a block diagram illustrating embodiments of an exemplary research recommendation system.

Embodiments of systems and methods for recommending research results are described herein. While aspects of the described research recommendation systems and methods can be implemented in any number of different configurations, the embodiments are described in the context of the following exemplary configurations. The descriptions and details of well-known components and structures are omitted for simplicity of the description, but would be readily familiar to those having ordinary skill in the art.

The description and figures merely illustrate exemplary embodiments of the inventive research recommendation systems and methods. It will thus be appreciated that those skilled in the art will be able to devise various arrangements that, although not explicitly described or shown herein, embody the principles of the present subject matter. Furthermore, all examples recited herein are intended to be for illustrative purposes only to aid the reader in understanding the principles of the present subject matter and the concepts contributed by the inventors to furthering the art, and are to be construed as being without limitation to such specifically recited examples and conditions. Moreover, all statements herein reciting principles, aspects, and embodiments of the present subject matter, as well as specific examples thereof, are intended to encompass all equivalents thereof.

In general, the systems and methods described herein may relate to improvements to aspects of searching for information using a computer. These improvements not only improve the functioning of how such a computer (or any number of computers employed in the search) is able to operate to serve the user's research goals, but also improves the accuracy, efficiency and usefulness of the search results that are returned to the searcher.

In one embodiment, the inventive system may be configured to identify a list of candidate or recommended case documents (i.e. authorities) given an issue segment in an input brief, memorandum or other body of text. Then, the system may be configured to rank these candidates or recommendations according to, for example, how relevant they are to a legal issue in the input document, how relevant their jurisdiction is to an input issue, and/or how authoritative and/or recent they are. Each case document may contain rich and heterogeneous metadata, which may be fully leveraged by this system to decide the ranking order of the case documents through the learning-to-rank mechanism.

In another embodiment, the inventive search tools described herein generally are configured to receive explicit and implicit research information from a user and to use one or both of those types of information to return a set of search results. For example, in some embodiments, the user does not even need to enter a search command at all for the tools described herein to enrich their research experience by suggesting information that may be relevant to their ongoing research based on simply monitoring their past and/or present activities. The tools described herein are particularly suited to legal research and are generally discussed in that context, however it will be appreciated that many other types of research and researchers will benefit from the inventive tools disclosed and claimed herein.

In one embodiment, a system and methodology for research recommendation begins with an attempt to ascertain the focus and scope of a user's research. With this knowledge, the system is configured to identify information relevant to the user's research and return it to the user. Such input, analysis and output aspects of the present system are described in detail below.

The present system may be described in the context of information being comprised in "documents." In this sense, a document is simply a logical container for information. Examples of documents in the legal research field may include, for example, court opinions, motions, briefs, transcripts, secondary sources such as treatises or articles, statutes, web pages, etc. Documents may also comprise issue summaries or index headings rather than judicial opinions, briefs, secondary source chapters or other longer-format documents. For example, a document that is returned by the system may be a Westlaw Key Number, headnote or American Law Review ("ALR") article. It is also possible that one document may exist within another document—for example a book may be considered a document and also each chapter within that book may also be considered a document.

In the present system, a user may be provided with the opportunity to search for one or more documents by entering search criteria in a search engine. As a simple example, a user may be permitted to search for all documents with a particular text string in its body. In another example, a user may be permitted to search for all documents authored by a particular person or in a particular jurisdiction. In yet another example, a user may search for a particular document by inputting its document identifier (e.g., a case cite) or by clicking on a link to that particular document.

Once documents are identified to a user as a result of a search or otherwise (e.g., receiving a document attached to an email or other communication from a colleague), users are permitted to interact with documents. Some examples of interactions include viewing a document, adding a document to a logical folder, highlighting a portion of a document, adding an annotation or comment to a document, printing, downloading or emailing a document, etc.

Users' search activities and other interactions with the system may be grouped into research sessions. A research session may be delimited by one or more characteristics such as, for example, an identity of the user, a client and/or matter for which the research is being conducted, a period of time, an IP address of the user's computer, etc. As one specific example, a session may be delimited by user, client and a time period between which the user logs onto and off of the system. In this example, a research session may begin when a particular user logs on and identifies that they are performing research for a particular client. That session will continue until the user logs off or indicates that they are changing the client for which they are performing research.

In one embodiment, shown generally in FIG. 1, a user's activity 102 serves as the input to a research recommendation system. In one aspect, the user's activity may be interpreted as an explicit indication of a document's relevance. For example, a user may put a document that they consider to be relevant in a folder 104 that they are using to collect their research. In another aspect, a user's interactions with documents and the system more generally may be analyzed 106 to extract activity information to identify documents that are relevant to the user's research without an affirmative indication by the user as to the identity of those documents. In other words, the system may be configured to infer from a user's actions which documents are relevant. Such activity information may also be analyzed to identify search information input by the user 108 or text strings 110 that are relevant to the user's research.

Figure 2:
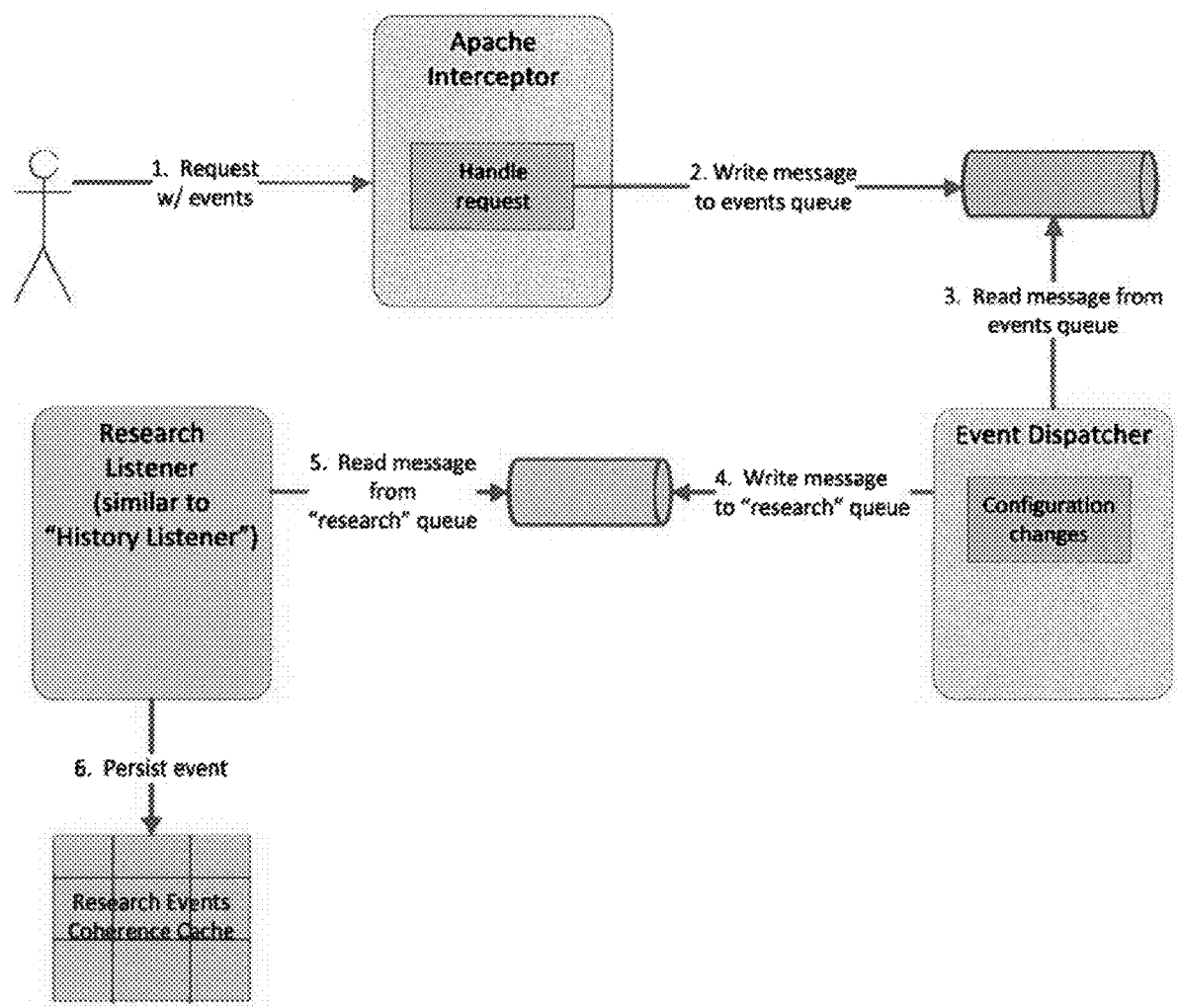
FIG. 2 shows a block diagram illustrating an example of an activity analysis component according to an exemplary embodiment.

FIG. 2 shows one example of an activity analysis component. As shown, the system may receive requests or other research "events" from a user. Research events may include, for example, searches, document views, requests to folder a document, etc. Research events may also include other document interactions such as highlighting a portion of the document, adding an annotation or comment to a document, printing, downloading or emailing a document, etc.

As research events are received, they may be written to a queue of such events awaiting execution by the system. An events dispatcher component may be configured to read and dispatch research event requests to other components. For example, a search request may be forwarded to a search component, a request to folder a document may be sent to a document foldering component, etc. In addition to facilitating the execution of the research events, the event dispatcher may also copy the research events to a research queue for analysis. A research listener component may be configured to read the contents of the research queue and persist them in a coherence cache for further analysis.

As one specific example of research activity analysis, a user may search for all documents containing a particular text string. After receiving, for example, ten resulting documents that are each displayed with a short summary or extract of their contents, the user decides to view three of the documents. Of those, the user adds one of the documents to their research folder and prints a second document. In this example, the system may be configured to identify the one foldered document as an explicitly identified relevant document. The system may also be configured to analyze the other interactions to infer relevant documents. In the example described above, the three documents that the user viewed may be considered relevant on the basis that they were viewed. In addition to simply identifying whether documents are relevant in a binary sense (they are relevant or they are not), the system may also be configured to analyze how relevant the document may be to the user's research based on the type of interactions that the user has with the document. For example, the system may be configured to weight the relevance of documents that are printed or downloaded more heavily than those documents that are simply viewed. Other characteristics may also be used as a basis for identifying relevant documents and/or determining a relevancy weighting including, for example, the time spent by a user viewing a document, whether the user highlights or adds annotations to a document, the number of documents viewed in relation to the number of search results returned, the ranked order of a viewed document within the search results, whether a user has copied and pasted information from a document to another program such as a word processing program, whether a user has requested a listing of other documents referencing a given document (e.g., a citation report), etc.

As shown in FIG. 1, foldered documents as well as documents inferred to be relevant may be collected together 112 and analyzed 114 to determine the focus and scope of a user's research. It should be noted that various additional filters may be applied to the documents collected for analysis. For example, the system may be configured to only analyze documents that have been foldered during the current research session and to disregard documents that were added to the same folder by other users or in previous research sessions. As another example, the system may be configured to only include in its analysis the most recent predefined number of documents that have been interacted with by the user and inferred as relevant. For example, the system may be configured only to include in its analysis documents that were foldered during the current session and also the last five documents that were viewed by the user.

Once identified and collected 112, the documents may be analyzed 114 to determine common legal issues, common citations (references to other documents), common rare words and common usage or interaction patterns that have been detected from other users' research sessions. With the goal being to identify 116 other or potentially more helpful documents to the user, the system may be configured to analyze the collected documents several ways.

In one aspect, the system may be configured to identify common issues in the documents and then to identify other documents that discuss or are relevant to that issue. For example, the system may analyze the collected documents and determine that they all relate to the legal issue of "misappropriation of trade secrets." With this issue identified, the system may be configured to find other documents relevant to this legal issue. Several strategies to determine the issue(s) relevant to a document may be employed.

In one example, all documents in the system may be reviewed and issues may be identified and/or summarized in advance of any users' research session. A notation of identified issues and/or summaries may be added to or stored in connection with documents. One example of this approach is Westlaw's Key Number System. Thus, when a user begins researching, a database of documents and associated issues may already be in existence. In all cases, no matter when an issue is associated with a document, that association may be binary (an issue is relevant to the document or it is not) or may be weighted by an issue relevancy score—issues that are more relevant to a particular document being given a higher relevancy score than other issues that are less relevant to that document.

In another example, documents may be analyzed in connection with a secondary source reference such as a treatise, digest or textbook. For example, ALR 118 is a secondary source that provides articles on a wide array of legal issues. If a document cites or is cited by an ALR article, the system may be configured to associate the issue that is the topic of the ALR article as being an issue relevant to the document.

In another aspect, aggregate user interaction data or other research session information across many different research sessions 122 may be analyzed to link issues with documents. Such an analysis may be performed before or during a user's research session. In one example, the system may be configured to analyze the interactions of users involving a particular document to determine an issue being researched in the same session or around the same time that the users interacted with the document and then to link that issue with the document. It may be sufficient to assign an issue to a document based on a single such linkage or a predefined number or ratio of linkages may be required in order for the system to affirmatively assign an issue to a document. For example, the system may be configured to assign an issue covered by an ALR article to a document if at least ten users in the last month have viewed that document in the same session as they viewed that ALR article. In another example, the system may be configured to assign an issue covered by an ALR article to a document if at least ten percent of users who view that document also view that ALR article in the same session or vice versa.

In another aspect, the system may be configured to identify other documents that are relevant to the collected documents without attempting to identify common issues. For example, the system may be configured to identify the set of documents that cite to or are cited by any of the collected documents or a predetermined minimum number of collected documents (e.g., a document may be considered relevant if it cites or is cited by at least two of the collected documents). Each of these citing or cited documents may be inferred to be relevant to the user's research.

In another example, the system may be configured to identify documents relevant to the collected documents by analyzing aggregated research session data from other users to determine which other documents other users interacted with in the same session as the collected documents. For example, if in a current session a user folders document A, the system may be configured to identify all other research sessions in which A was foldered and to return as relevant the other documents also foldered in those other sessions. Various limitations may be imposed on such a feature. For example, previous research sessions may be reviewed only if they involved at least a predetermined number of documents in common with the collected or foldered documents of the current session. In another example, a document weighting system may be imposed as described above with respect to inferring relevant documents in which the returned documents identified in other users' sessions may be ranked or truncated based on the level of interaction other users had with those documents (e.g., documents foldered or printed may be weighted more heavily than those simply viewed).

In another aspect, a user's session activity outside of a document context may be compared with aggregate session information to identify relevant documents. For example, a current session may be analyzed as described above to determine the search parameters or strategies being used and to compare that search information to search information used in other previous sessions. If there is a strong enough of a match to enough previous sessions, the documents from those previous sessions may be returned as relevant to the current session. In a similar example, text strings identified from the current session (e.g., search text strings, text strings copied, analyzed or highlighted from documents, etc.) 110 may be compared to documents or text strings involved in previous sessions and, if there is a strong enough of a match to enough previous sessions (over a threshold), the documents from those previous sessions may be returned as potentially relevant to the current session.

Figure 4:
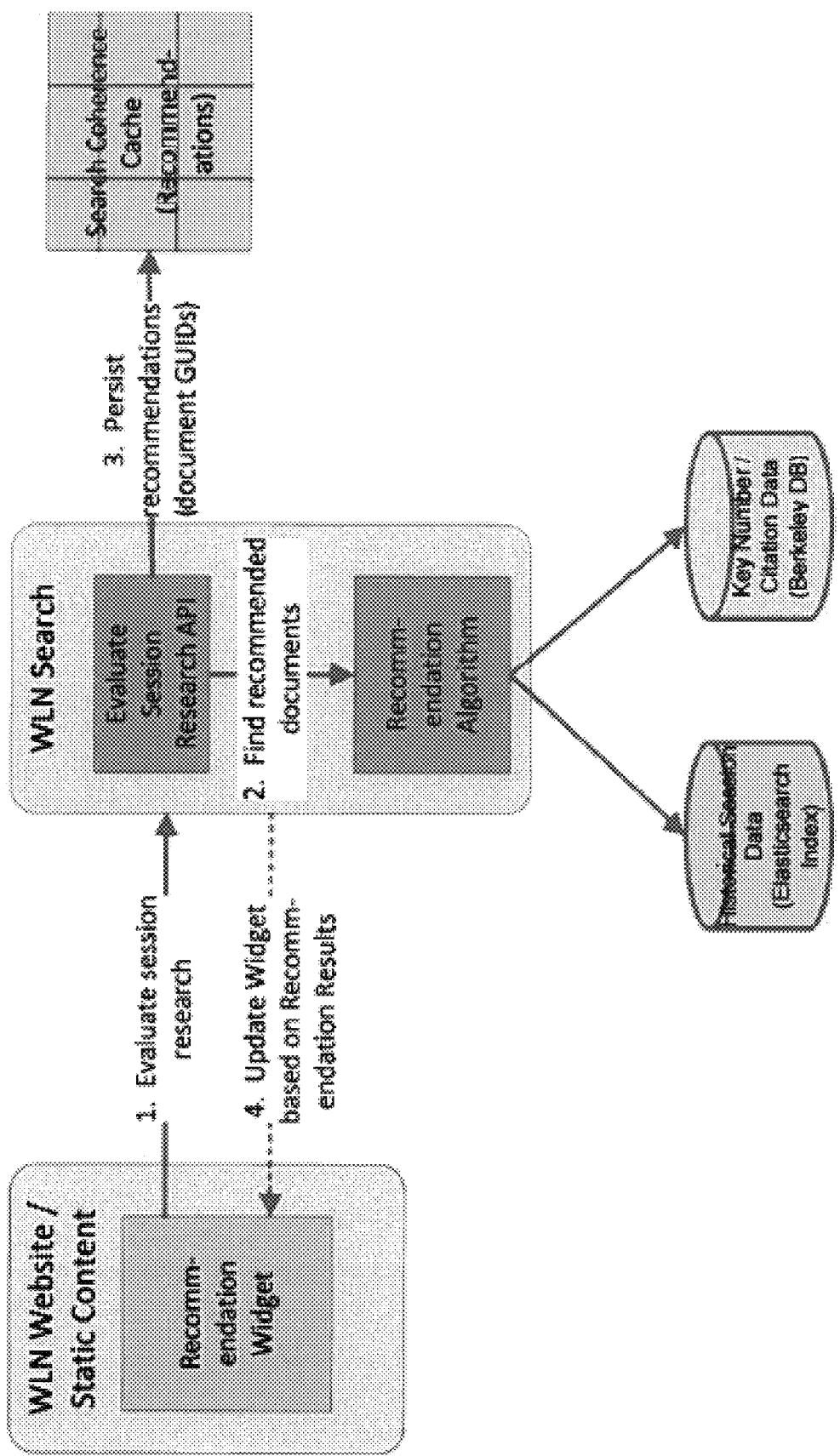
FIG. 4 shows a block diagram of an exemplary document search component according to an exemplary embodiment.

FIG. 4 shows block diagram of an exemplary document search component according to an exemplary embodiment. As shown in FIG. 4, a user may interact with a website or static content displayed thereon. The user's research session information is evaluated by an API (Application Programming Interface) and recommended similar documents are searched for and found. Similar document recommendations are developed from historical session data and West Key Number and document citation data. A record of the document recommendations is persisted in a search coherence cache and a widget in the website being used by the user is updated with the document recommendations.

Figure 3:
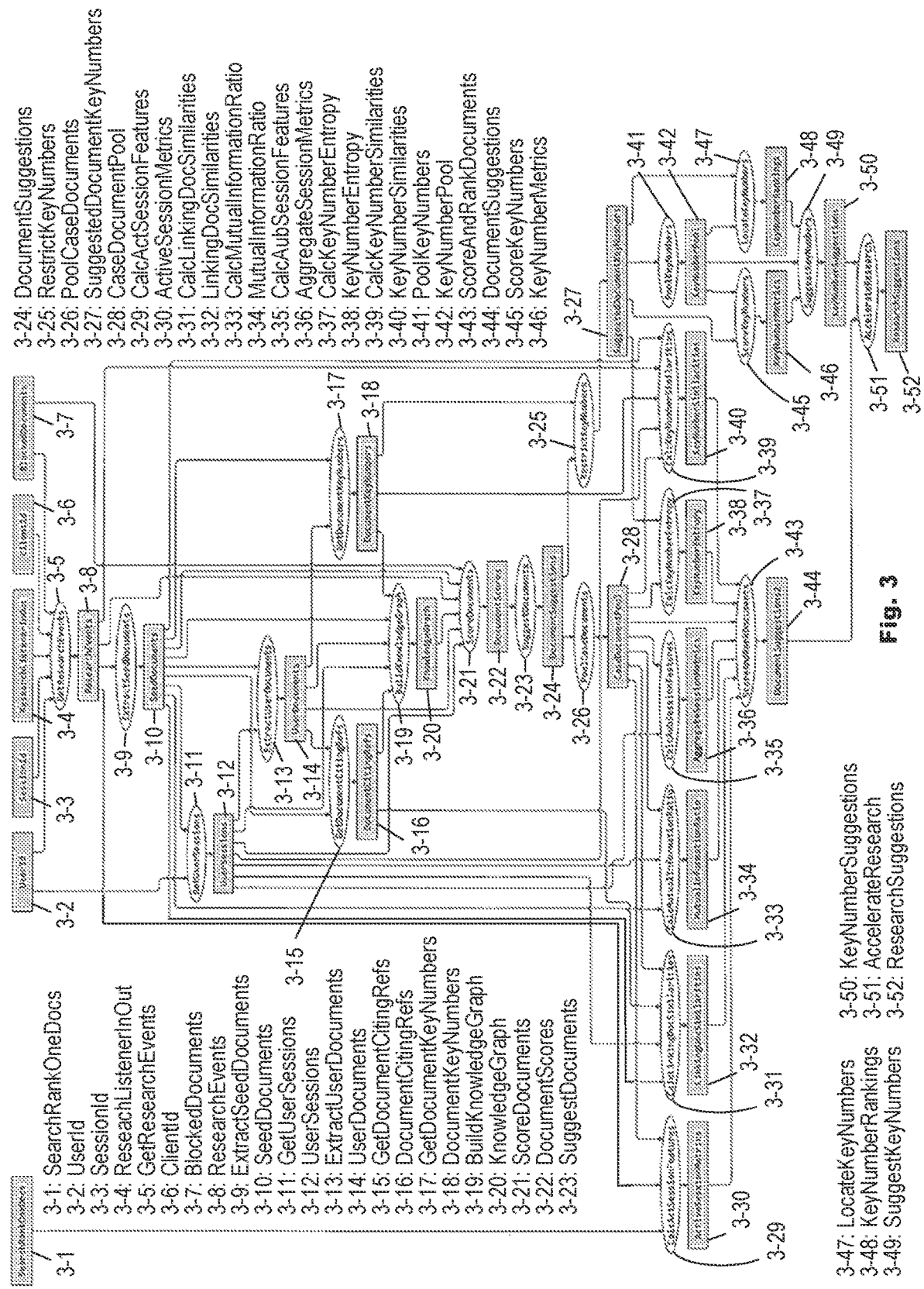
FIG. 3 shows a block diagram of a research recommendation system according to an exemplary embodiment.

Once a pool of similar documents is identified as discussed above, they may be ranked and/or filtered 124 before being returned to a user. FIG. 3 shows a block diagram of a research recommendation system according to an exemplary embodiment. The system shown in FIG. 3 includes several ranking tools. For example, various tools for ranking the similar documents may be employed including, for example, the level of similarity between the result documents and the documents collected from the session, the authoritativeness of the similar documents, the frequency with which the similar document arises in similar user sessions, etc.

In one aspect, a ranking component of the system may be configured to compare aspects of the similar documents to aspects of the documents collected from the current session to determine a level of similarity. For example, the set of issues identified in the collected documents may be compared to the issues in a particular similar document to determine a similarity score between the collected documents and that particular similar document. The issue relevancy score discussed above for the documents may be a parameter in such a relevancy determination. As discussed above, issues in documents may be identified in any number of ways including, for example, with reference to Westlaw's Key Number System 120. In one example, the use of such a similarity score as a ranking metric may take into account the level of focus ("entropy") of the current session in terms of the number of issues identified from the collected documents. For example, if the documents collected from the user's activity and foldering are determined to concern ten different issues in a particular session, then the similarity score used to rank similar results may be weighted less than other ranking mechanisms than it would be in a session in which the collected documents are determined to concern only two issues.

In another aspect, the level of authoritativeness of a document may be analyzed by a ranking component and used as a basis for ranking similar documents. For example, if a particular similar document is cited to by a very large number of other documents, it may be ranked higher than another similar document that is cited to by fewer documents. Such an analysis may also be focused to consider only or more heavily the citations within the pool of similar or collected documents. For example, a similar document may be ranked higher if it is cited to by more of the collected documents than another similar document. Similarly, a similar document may be ranked higher if it is cited to by more of the other similar documents than another similar document.

In another aspect, aggregate session information may be evaluated by a ranking component to rank a particular similar document. In one example, a document may be ranked according to the level of interaction users had with it in sessions similar to the current session. As discussed above, the determination of which sessions may be similar to a current session may include, for example, a comparison of documents interacted with in the different sessions. As is also discussed above, a level of interaction with a document may be determined according to a cumulative or average weighted interaction score. For example, if printing a document is an interaction assigned a score of five, viewing a document assigned a score of one, foldering a document assigned a score of ten, and so on, an average interaction per session score may be determined for all similar sessions to the current one in order to arrive at an average interaction score for a particular document that is particularly relevant to the current session. Such an aggregate interaction score may also be used as a filter is a minimum interaction score is set as a threshold, for example.

In another example, a particular similar document may be evaluated for its similarity to the collected documents based on the aggregate session information relevant to the particular similar document to obtain a candidate similarity score, which can serve as a basis for ranking similar documents when they are returned to a user. If more than one collected documents exist, the candidate similarity score for a particular similar document measured against each collected document may be averaged, either as a mean average or as a weighted average using any of the weighting techniques described herein, to obtain an aggregate candidate similarity score.

To compare a particular similar document to a collected document, one exemplary technique is to determine the Mutual Information between Bernoulli random variables which model the relevance or non-relevance of a particular similar document in a particular previous session. For example, if a particular similar document is found on the basis that it was interacted with in a previous session that is very similar to the current session, the comparison may determine how relevant that particular similar document was to that previous session. If it was the most important (measured in any number of ways including, for example, the relative level of interaction the previous user had with it in the previous session versus other documents interacted within that session or its relative relevance to the issues associated with the previous session), then it would be given a higher candidate similarity score for that particular previous session. In another example, a similar document may be compared to a similar session in which the similar document was not interacted with. In this example, a comparison between the similar document and the issues relevant to the similar session, the documents interacted with in the similar session, etc. may be evaluated according to the techniques described herein and used as a basis for determining the candidate similarity score with respect to that particular similar session. In one example, not all previous sessions need be evaluated—for example, only previous sessions in which more than a predetermined number of documents relevant to the current session were interacted with may be evaluated in connection with a particular similar document.

In another example, aggregate session information may be used to rank similar documents by serving as the basis for a session similarity score. In this example, all sessions or all similar sessions (whether a session is similar may be determined as discussed above) in which a particular similar document is interacted with may be compared to the current session to determine a level of similarity. For example if a particular similar document is identified according to any of the avenues discussed above, all sessions involving interactions with that document may be recalled from an aggregated session information database. Then, a comparison between each of those sessions and the current session is conducted to obtain a similarity score. Various metrics may be employed to arrive at such a score including, for example, the number of common issues or documents in the sessions, the relative overlap between issues or documents in the sessions (i.e. if the current session involved issues A, B, C and D and a previous session involved issues B, D and E, there may be said to be a $2/5$ or 40% overlap of common issues vs. all issues), etc. Similar to the issue entropy concept discussed above, a session entropy level may be used as a basis to modify a session similarity score to, for example, discount or enhance a session similarity score's weight in an overall ranking of a particular similar result candidate based on how focused or wide-ranging a current session or aggregated sessions may be.

In another example, a determination of the relative overlap between issues relevant to a previous session and issues relevant to a current session may follow Cosine, Jaccard or Tanimoto (also known as Min/max ratio) similarity quantification techniques. The relative issue overlap determination may also employ a weighted Cosine or Tanimoto similarity, with weights determined by intrinsic properties of the sessions, including, for example, the length of the session, whether session activity was the result of navigation other than search, and whether the user examines results below the top ranks of a search result list, the entropy of the issues in the result, etc.

Upon ranking the documents that are identified as being similar to the collected documents or the issues that are the focus of the current session, they are returned to the user. In some examples, only the top number of results are returned (e.g. the top three ranked results). In some examples, the set of documents returned is continually and dynamically updated based on the user's interactions in the current session as they happen. For example, an instance of a user foldering a document in a current session may trigger an analysis of the foldered document to determine its relevant issues, a renewed search for similar documents to those interacted with in the current session (now including the newly foldered document) and a re-ranking of results.

It is important to note that in some instances, there may not be any similar documents of sufficient relevancy or quality to recommend to a user, as determined by any suitable threshold on the similarity and ranking parameters discussed herein. It is also a possibility that the user's interaction in a current session are not voluminous enough to determine relevant issues or documents, and on that basis no recommendation would be possible.

Figure 6:
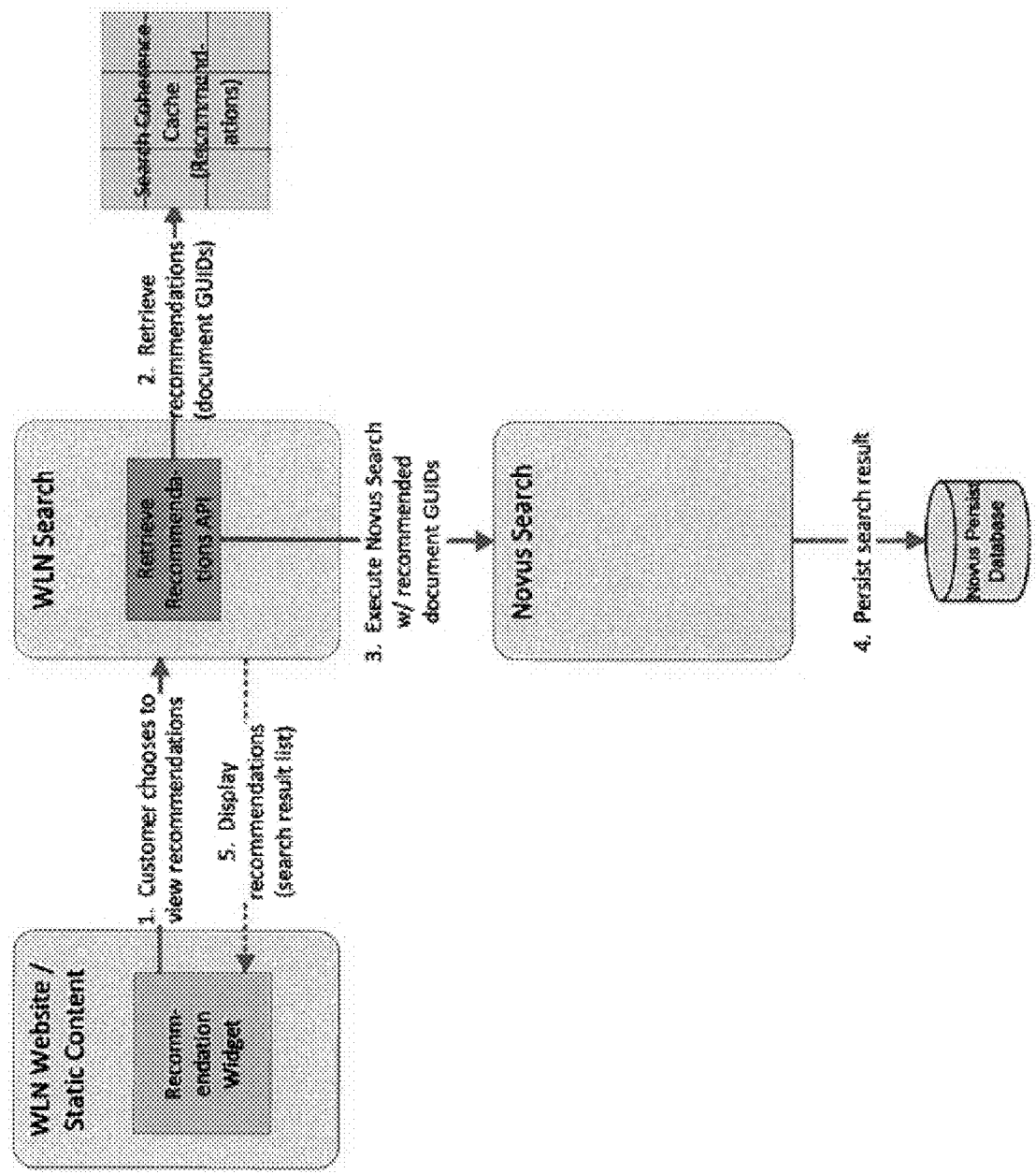
FIG. 6 shows a block diagram of an exemplary result return component according to an exemplary embodiment.

FIG. 6 shows block diagram of an exemplary result return component according to an exemplary embodiment. As shown in FIG. 6, after a user indicates a desire to view recommendations, a recommendation retrieval API retrieves the recommendations from a search coherence cache based on the user's current session information. If recommendations are available, the API retrieves them from a persistence database via a search of the database. The results are returned to the user's website via a widget in the website.

FIG. 7 provides an overview of one example of a research recommendation system according to an exemplary embodiment.

FIG. 8 provides a summary of one example of a research recommendation system according to an exemplary embodiment.

FIGS. 9-15 provide an example of a client situation in which a research recommendation system according to an exemplary embodiment is employed.

In FIG. 9, the client situation is identified as one in which an employee quits and takes copies of customer emails. The employer has called their attorney to ask what the legal options are and would like an answer today.

Figure 10:
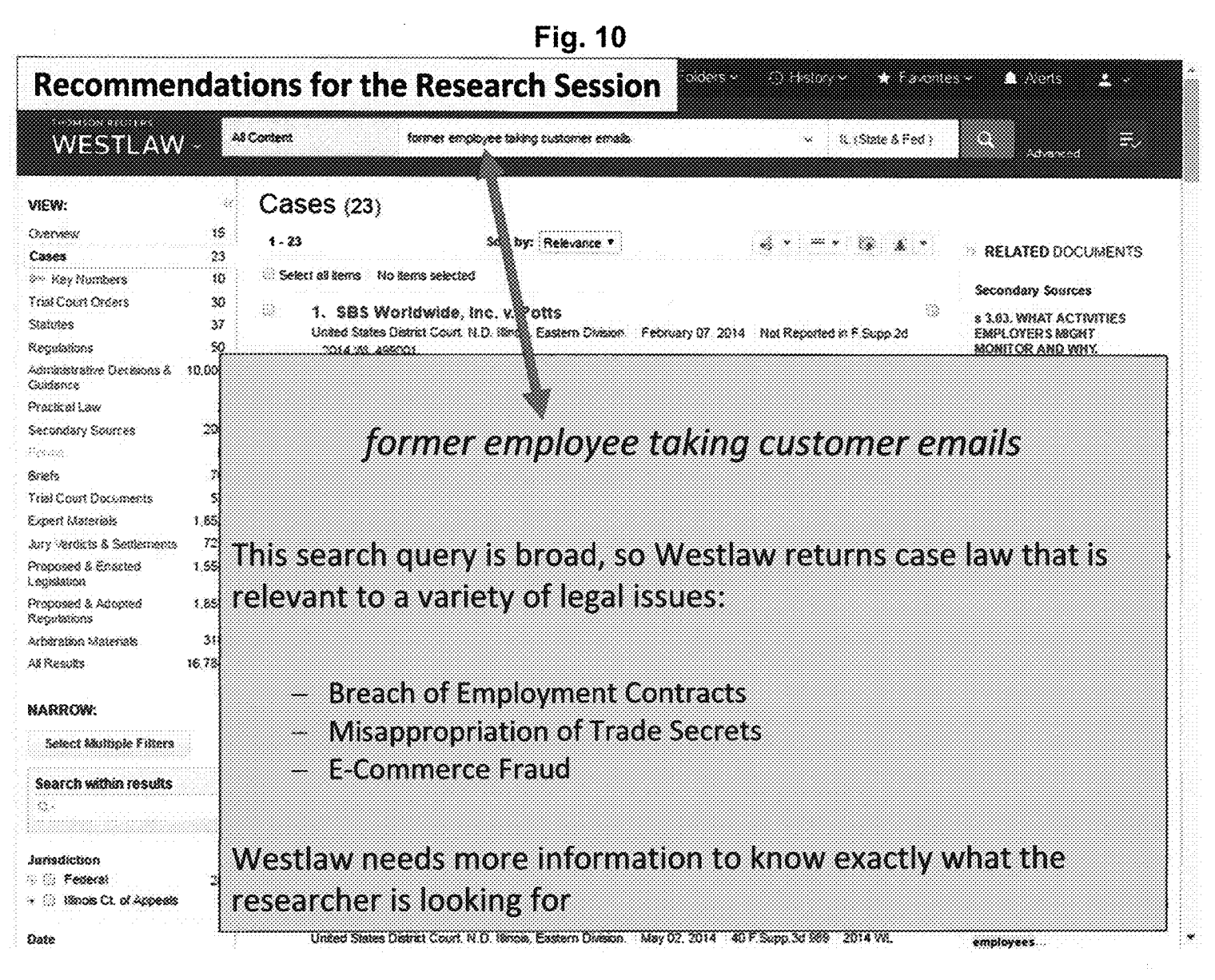

In FIG. 10, the attorney (user) may initiate a search for relevant documents by entering the search string "former employee taking customer emails" into a legal document search engine. Because that search is relatively broad, the case law documents returned are broad and are associated with several different issues, including breach of employment contracts, misappropriation of trade secrets and e-commerce fraud.

Figure 11:
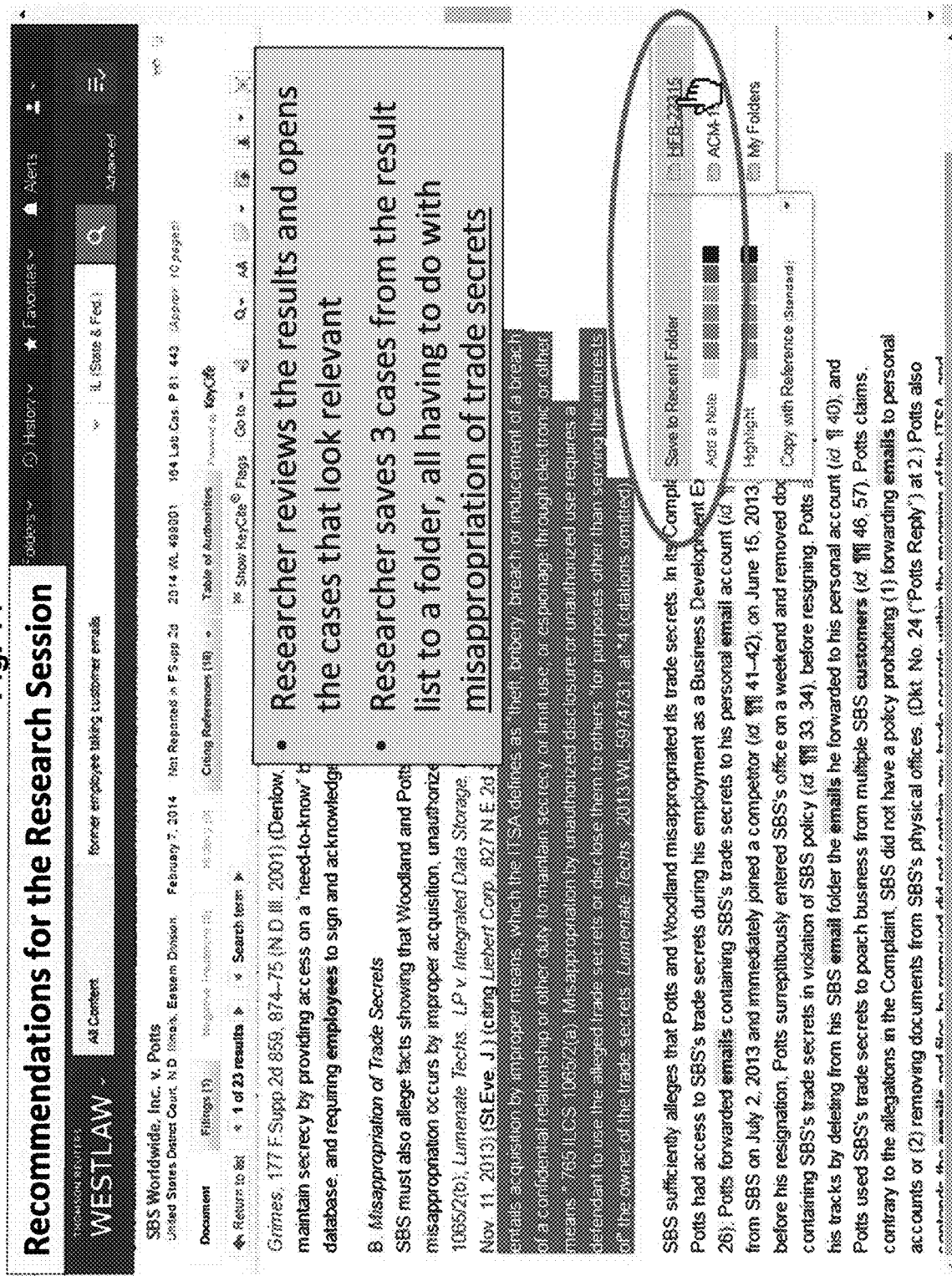

In FIG. 11, the user reviews the results and views several cases that they think might be relevant. Of those, the user folders three documents. The three foldered documents are analyzed and determined to be relevant to the issue of misappropriation of trade secrets.

Figure 12:
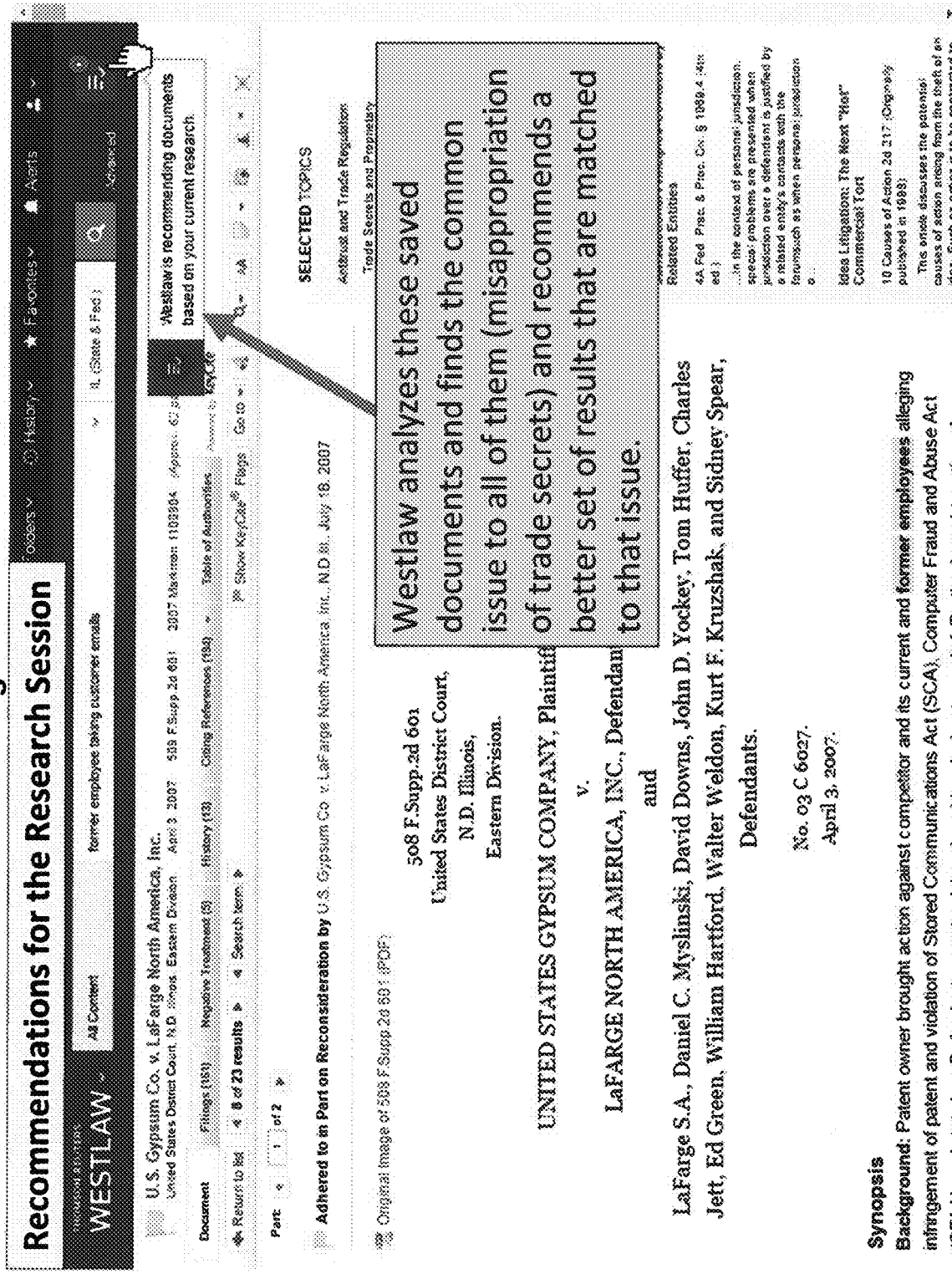

In FIG. 12, an icon indicating that research recommendations are available is displayed to the user in a widget on a webpage that the user is using.

In FIG. 13, after the user opts to view the recommendations, the recommendations are returned to the user. As shown in FIG. 13, results may include brief summary documents such as West Key Numbers and may also include case law documents, shown in the figure with a brief summary of each document. Of course, the results may also include statutes, secondary sources and regulations.

Figure 14:

In FIG. 14, the results returned may also include an option to view the logic behind why the system produced the results and an option to toggle between different types of documents that are returned (i.e. cases or statutes).

Figure 15:
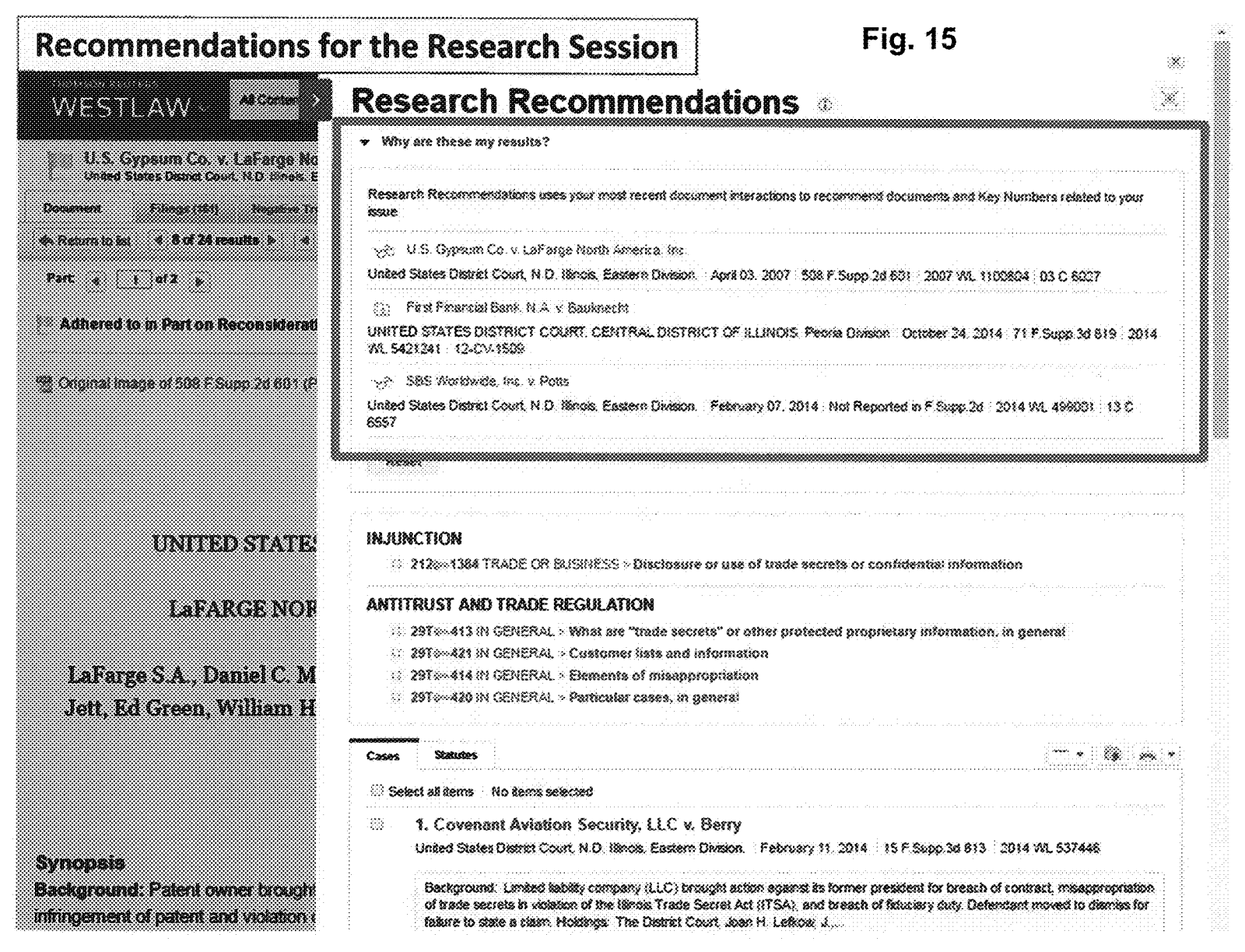

In FIG. 15, the logic behind why the system produced the results that it did is displayed as a result of the user selecting that option shown in FIG. 14. In the example shown in FIG. 15, the results were returned based on the fact that user viewed the U.S. Gypsum case and the SBS Worldwide case and foldered the First Financial Bank case.

Figure 16:
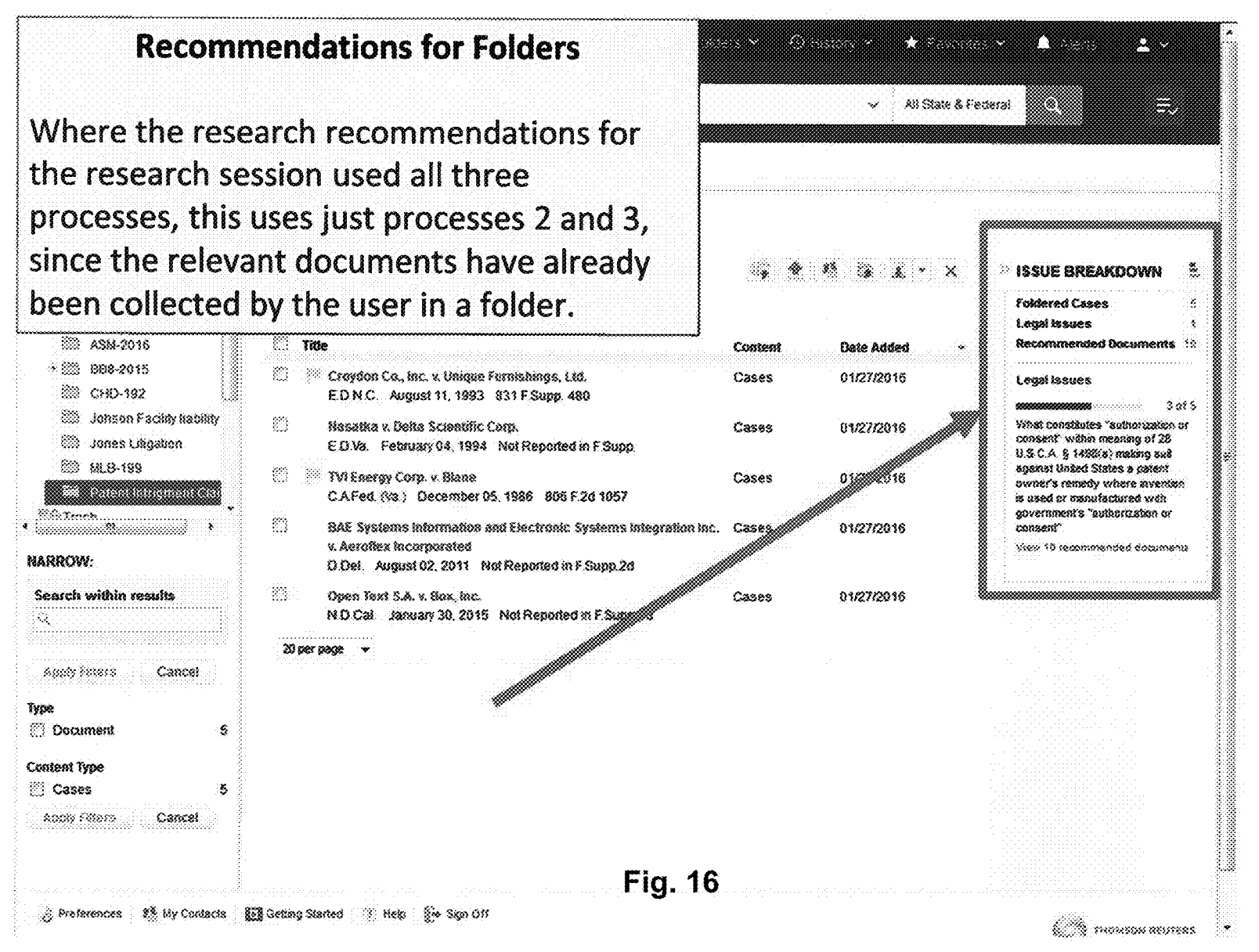

FIGS. 16 and 17 provide an example in which a research recommendation system according to an exemplary embodiment is employed to provide research recommendations based on the contents of a logical folder.

As shown in FIG. 16, the five cases placed in the folder by one or more users are analyzed to determine issues associated with the document. In the "Issue Breakdown" portion of the web page, potentially provided by a widget, the system indicated that it found one issue that was associated with three of the five documents and has ten document recommendations for the user for further research based on the contents of the folder and the identified issue.

In FIG. 17, upon the user clicking on the legal issue identified in the Issue Breakdown portion shown in FIG. 16, the ten recommended documents relevant to that issue are returned to the user.

Figure 18:
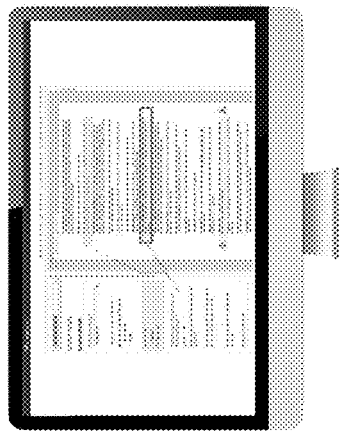
FIG. 18 provides an overview of one example of a research recommendation system according to an exemplary embodiment.

In another embodiment, a recommendation system may be configured to analyze an input draft document or portion of a document that is in the midst of being drafted or compiled for issues that are relevant to the document. As shown generally in FIG. 18, based on the issues identified in the input, documents are searched for, ranked and presented to the user to assist the user in further drafting of the input document. In the legal research context, many documents that are drafted contain citations to legal authorities such as case decision documents, statutes or secondary source such as treatise articles, etc. These citations, if included in an input document may be analyzed to give clues as to the issues relevant to the input document. In another example, the text of the input document itself may be analyzed to derive or extract issues important to the input document.

Figure 19:
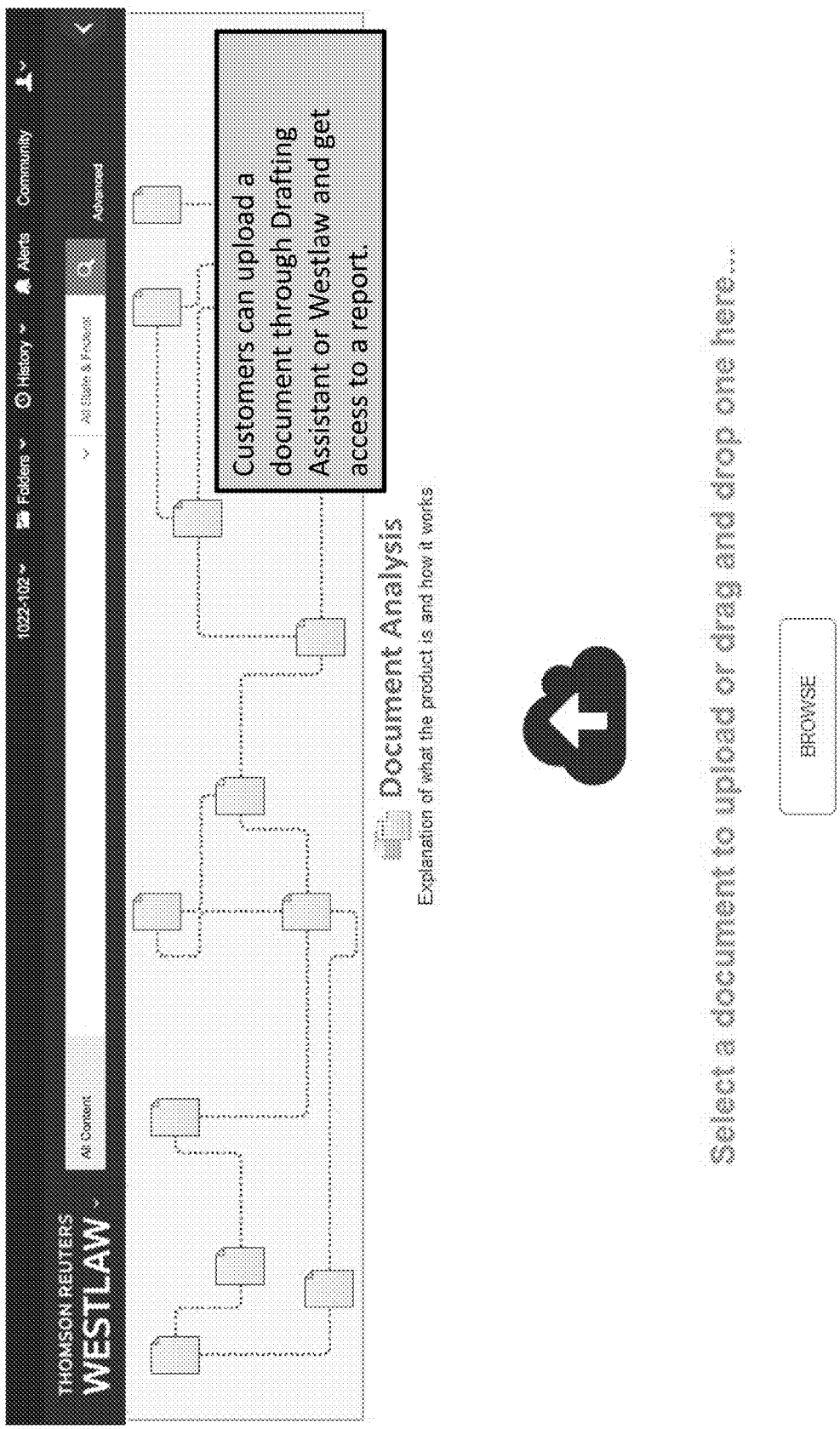
FIG. 19 shows an example of a user interface according to an exemplary embodiment showing a feature that allows a user to upload an input document or portion of input text such as a portion of a brief or memorandum that the user may be drafting.

FIG. 19 shows an example of a user interface that allows a user to upload an input document or portion of input text such as a portion of a brief or memorandum that the user may be drafting.

Figure 20:
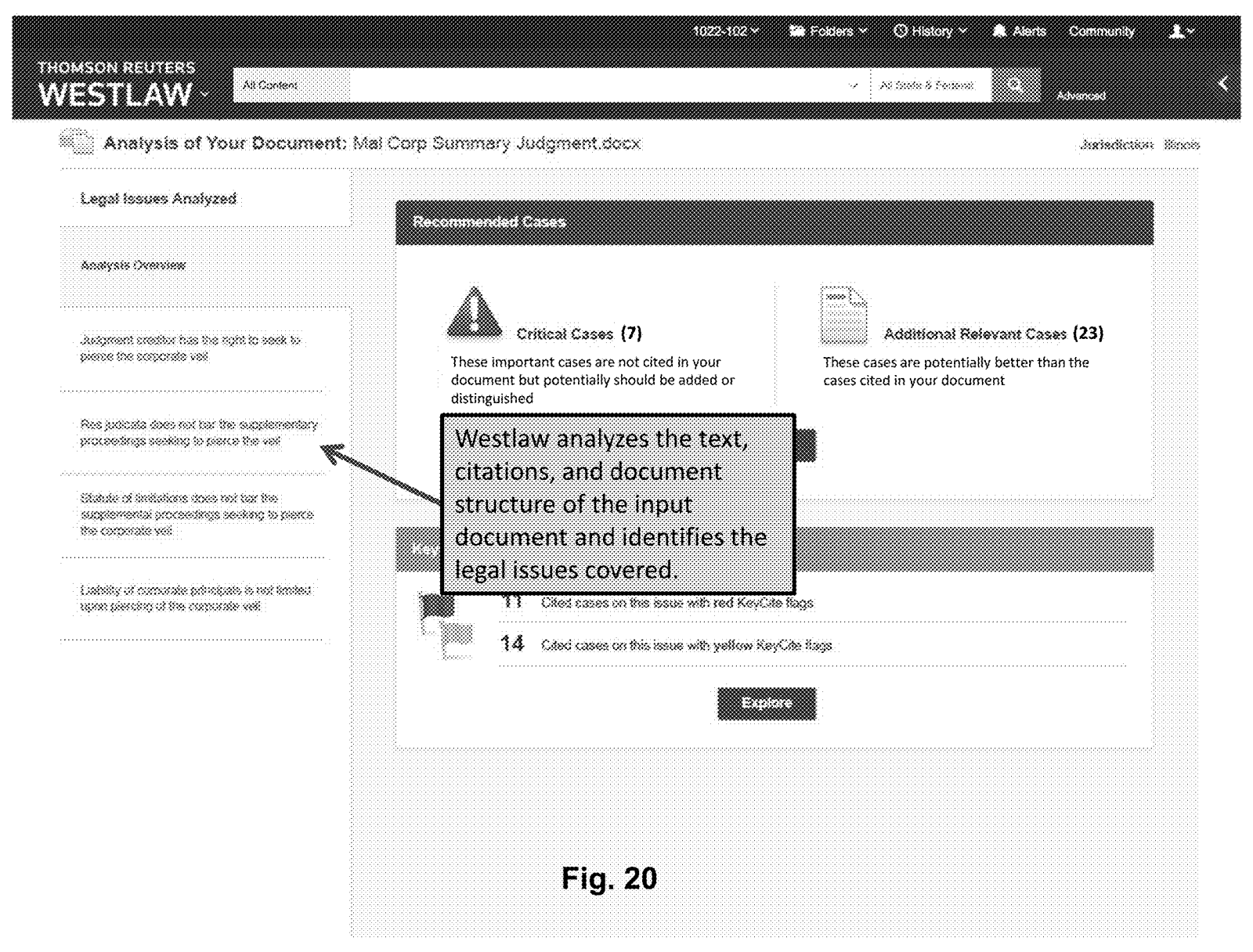

As shown in FIG. 20, the system may be configured to analyze the text of the input, which may include citations, a document structure or formatting, to identify issues that may be relevant to the input. In one example, the input may be converted to html format if it is not in that format already.

In one example, the input text may be analyzed to extract citations. Each of these citations may then be considered a "foldered document" as in the embodiment described above with respect to FIG. 1. Using the tools of embodiment described above, relevant recommendation candidate documents may be identified and ranked accordingly based on the extracted citations.

In another example, the citations extracted from the input text may include pinpoint citations to the cited reference and an analysis of the context involving the pinpoint citation or "pincite" may yield research recommendations.

Generally, citations follow a generic format, e.g.: *Commonwealth v. De Marco*, 387 Mass. 481 (1982). Often times, the citations are contextualized with an explanation about why the author has decided to cite them. The context can be a direct quote extracted from the citation: "Postconviction motions to withdraw pleas are treated as motions for a new trial." *Commonwealth v. De Marco*, 387 Mass. 481 (1982). Or it can be a general discussion of the cited document's arguments and outcome: Where the defendant has been unable to demonstrate prejudice from his counsel's alleged ineffective representation, an appellate court will affirm the order denying a motion to withdraw a guilty plea. *Commonwealth v. Chleikh*, 82 Mass. App. Ct. 718, 729 (2012). On many occasions, especially when the author includes a direct quote, the citation includes a page (or range of pages) as well. These pages indicate where in the target document the argument of interest located (page 482 or 482-3 in the following examples): "Postconviction motions to withdraw pleas are treated as motions for a new trial." *Commonwealth v. De Marco*, 387 Mass. 481, 482 (1982) or "Postconviction motions to withdraw pleas are treated as motions for a new trial." *Commonwealth v. De Marco*, 387 Mass. 481, 482-3 (1982). When the author uses a device such as a direct quote or a page number to pinpoint a certain argument from the cited document, the citation is known as a "pinpoint citation," or a "pincite."

Pincites can provide a narrow and on-point view of the cited arguments. Instead of citing an entire case (which may include several arguments, many of which may not be related to the context of the brief), pincites often point to certain relevant arguments that help support the brief's main points. Identifying pincites (and extracting the relevant arguments and issues from them) can help provide a precise picture of the contents of each brief or input text, which in turn helps with generating useful recommendations.

Figure 21:
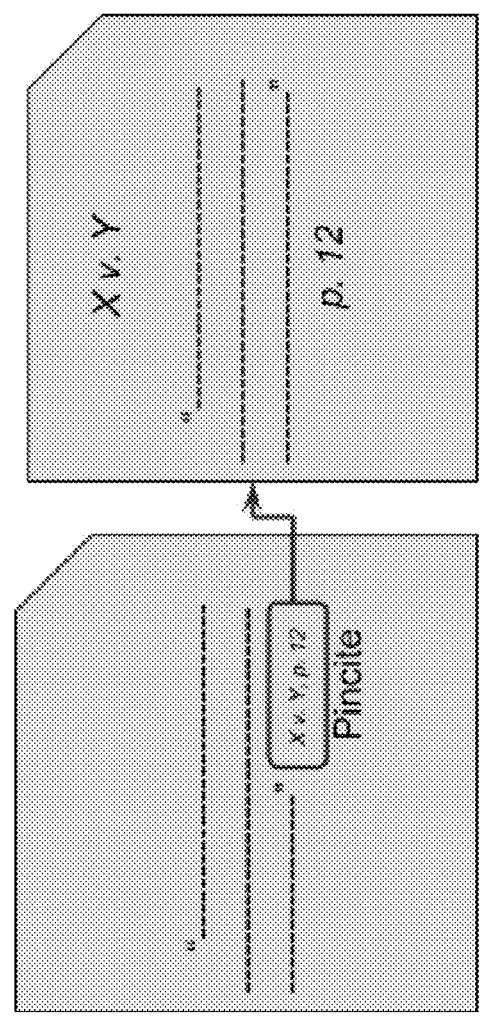
FIG. 21 shows a schema illustrating a pincite according to an exemplary embodiment.

FIG. 21 shows a schema illustrating a pincite. As shown in FIG. 21, the input brief (on the left) can have citations that point to a particular page or quote from a case document (on the right). If the citation can be reduced to a particular argument from the case document, it is generally referenced as a pincite.

In the inventive system, for every given case document, each argument may be extracted and isolated as a "headnote." Headnotes may be manually extracted and assigned a topic. Each topic may be associated with a set of unique identifiers known as "key numbers." Key numbers are organized into hierarchies (similar to the Dewey decimal system). The system may be configured to allow users to identify which cases have cited to which other cases. Specifically, it may be configured to allow users to identify which individual headnote(s) have been cited in the target case, as illustrated in FIG. 22.

Figure 22:
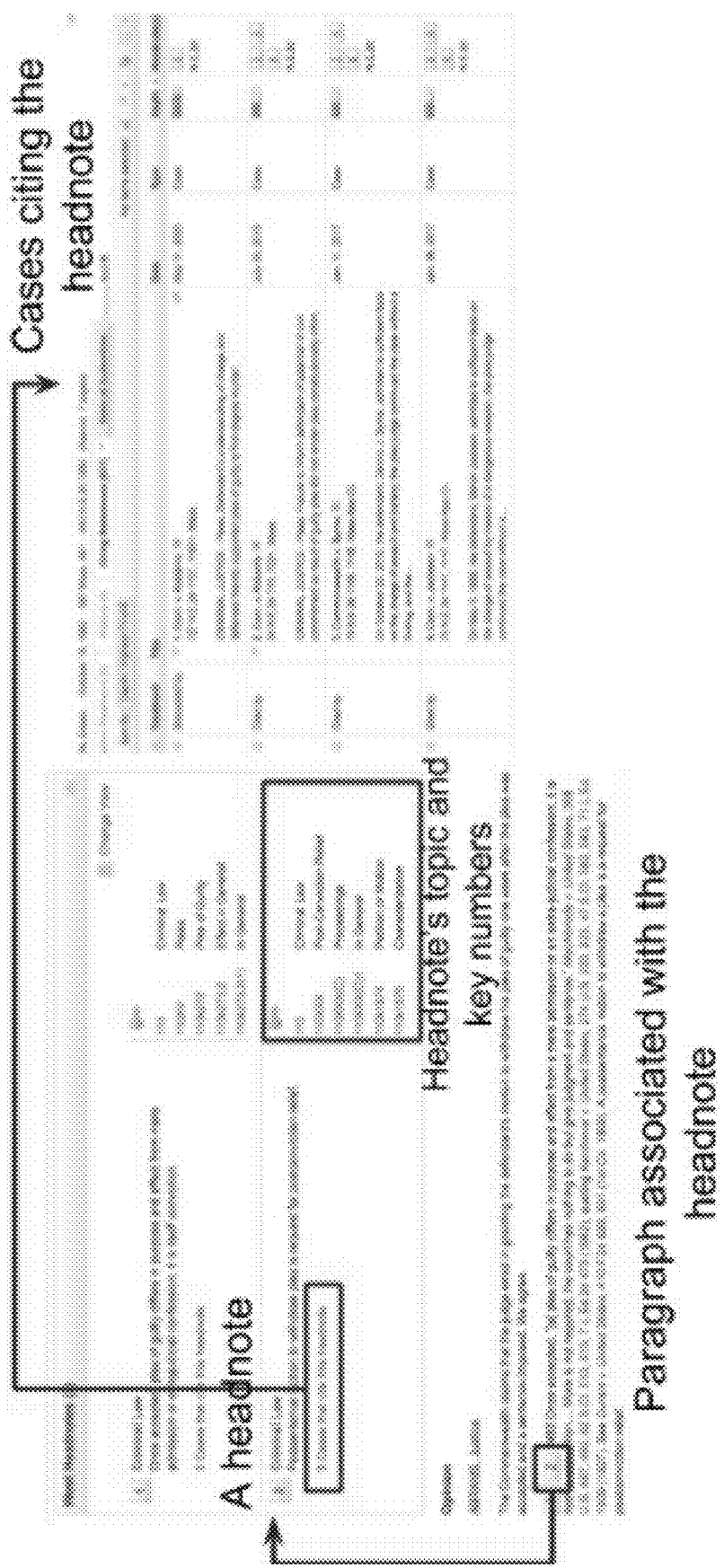
FIG. 22 shows examples of portions of user interfaces according to exemplary embodiments that demonstrate headnotes and their various implementations.

As shown in FIG. 22, each case is broken down into its individual arguments. If applicable, each argument is represented as a headnote. Headnotes are linked to their corresponding location within the document. Each headnote is enriched with metadata such as topic and key-number assignments. The system may also be configured to provide a list of cases that cite each headnote.

Figure 23:
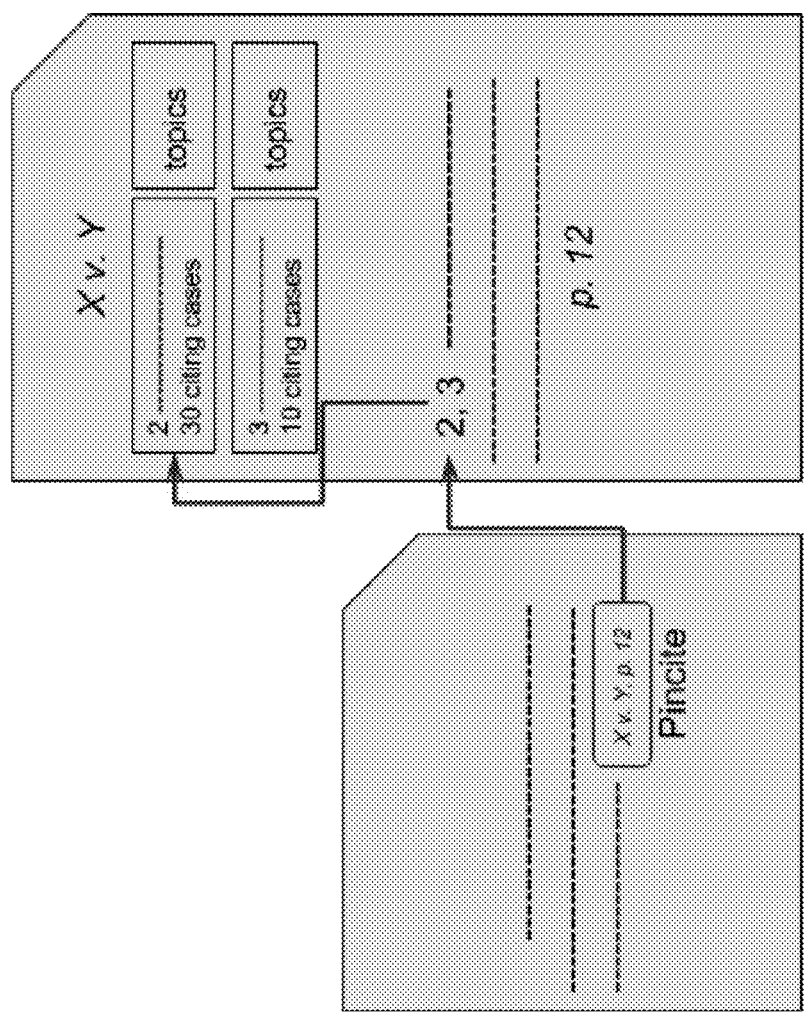
FIG. 23 illustrates a two step pincite extraction process according to an exemplary embodiment.

Thus, pincite extraction may be considered a two step process, as shown in FIG. 23. First, a citation is analyzed to determine whether the citation is a pincite. For example, in FIG. 23, the system is configured to determine that "X v. Y, p. 12" is indeed a pincite, look it up in the cited case, and determine that it is associated with headnotes 2 and 3. If a citation is a pincite, the headnote that best corresponds to the pincite may be extracted and identified as the headnote correlated to that pincite. For example, in FIG. 23, the system may be configured to determine that headnote 2 is the headnote that has been pincited. The 30 cases that cite headnote 2 may be relevant to the input text containing the pincite, and may therefore be recommended as candidates.

These two steps may be broken down further. For example, identifying pincites may involve extracting page numbers, extracting the context of the pincite and extracting the relevant portion of the cited document and identifying candidate headnotes. Each citation in the input brief is processed individually. A pattern-matching algorithm is used to identify if a page or range of pages are included in the citation. This is a relatively error-proof method, since most citation follow a standard format, i.e. <party1>v. <party2>, <primary citation of the case>, , (<court and/or year>). Below are a few examples of citations and their corresponding page number(s):

| Citation | Page number(s) |
| --- | --- |
| *Commonwealth v. De Marco*, 387 Mass. 481, 482 (1982) | 482 |
| *Winter Storm Shipping, Ltd. v. TPI*, 310 F. 3d 263, 278-79 (2d Cir. 2002) | 278 to 279 |
| *Seamar Shipping Corp. v. Kremikovtzi Trade Ltd*, 461 F. Supp. 2d 222 (S.D.N.Y. 2006) | no page numbers mentioned |

The context of a citation is the language around it, which usually describes how or why the citation is relevant to the input brief. The context may include a direct quote from the cited case, or it may be a general description of the contents of the case.

Figure 24:
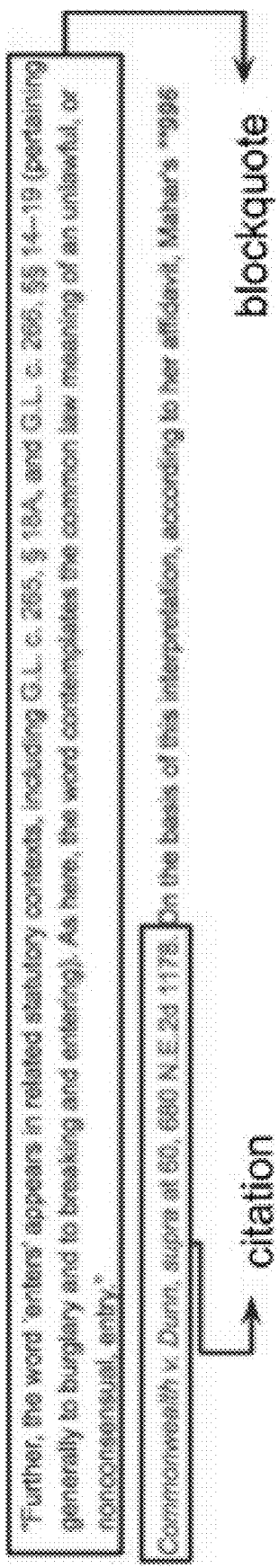
FIGS. 24 and 25 shows examples of portions of user interfaces according to exemplary embodiments that demonstrate blockquotes and their various implementations.
Figure 25:
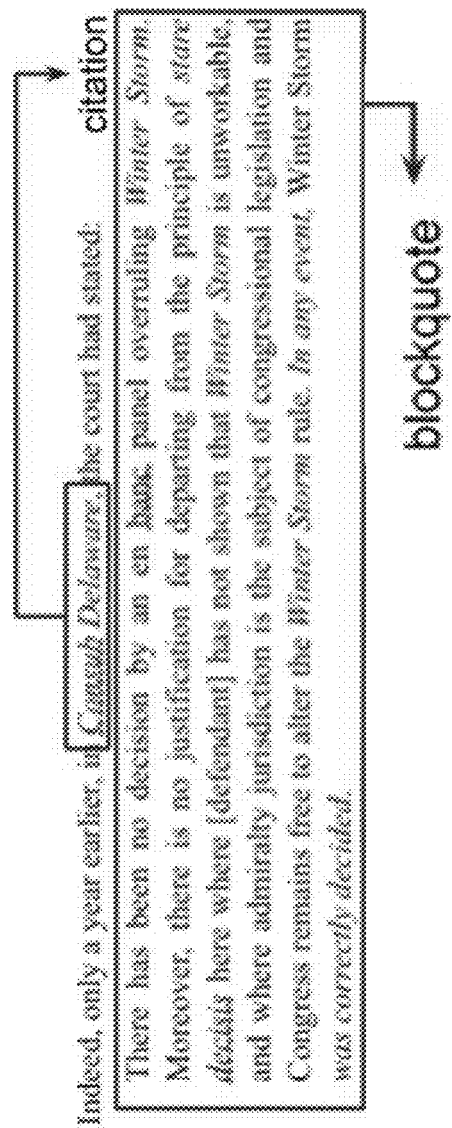

The context of each citation may be extracted by implementing the following algorithm. Given a citation $c_i$, the previous citation ($c_{i-1}$) or the beginning of the paragraph where $c_i$ occurs may be identified, whichever is closer to $c_i$. The next citation ($c_{i+1}$) or the end of the paragraph where $c_i$ occurs may be identified, whichever is closer to $c_i$. If the beginning of the paragraph was selected, and there is a blockquote immediately before the paragraph, then the blockquote may be included in the context. An example is shown in FIG. 24. Similarly, if the end of the paragraph is selected, and there is a blockquote immediately after this paragraph, then the blockquote may be included in the context. An example is shown in FIG. 25. If the context of the citation includes direct quotes, a "quote" flag may be added to it.

Having identified the relevant page(s) and the context of the citation, the cited document may be inspected further. First, the page(s) that have been included in the citation (if any) may be retrieved. Otherwise, all pages may be considered. Secondly, all of the headnotes that occur in the specified pages may be identified. The resulting set of headnotes may be known as the pool of "candidate headnotes." For instance, based on the example illustrated in FIG. 23, the algorithm may identify page 12 as the target page of the cited case. Following that page to the cited case, the algorithm may identify headnotes 2 and 3 of the cited case as potentially relevant.

Figure 26:
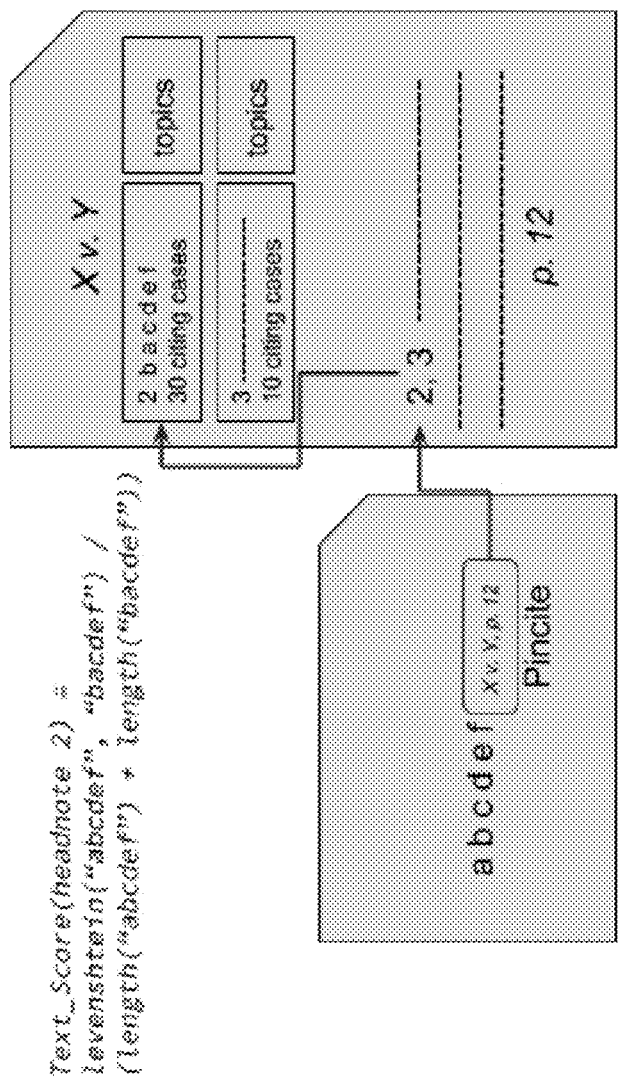
FIG. 26 shows a text similarity score calculation according to an exemplary embodiment.
Figure 27:
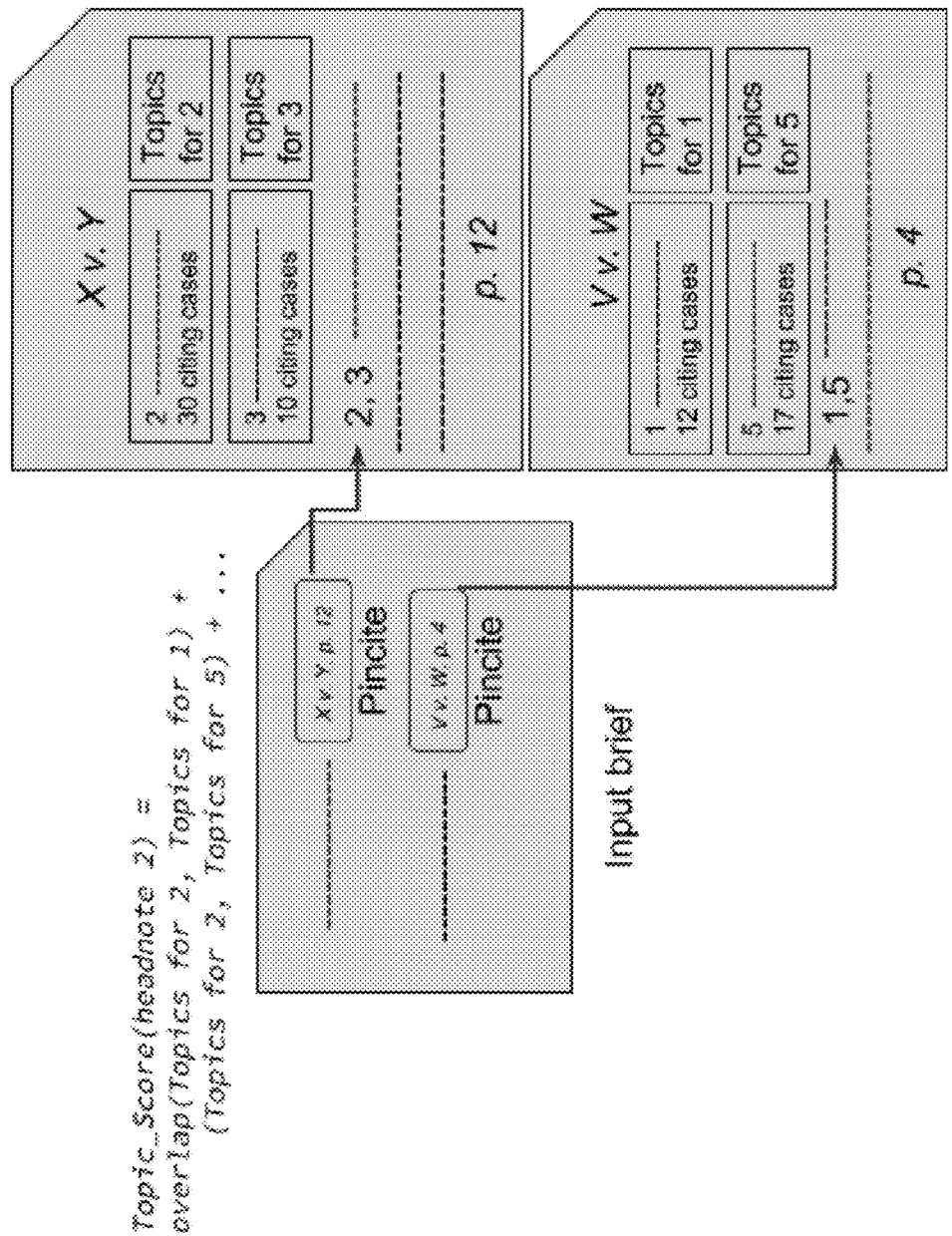
FIG. 27 shows a topic similarity score calculation according to an exemplary embodiment.

With the relevant or potentially relevant headnotes identified for a given citation or pincite, the headnotes may be scored and the best headnote may be identified. Two different scores may be calculated for each candidate headnote. In a first scoring example, the text of the headnote may be compared to the context of the citation. A text similarity score is calculated for the headnote. One exemplary text similarity calculation tool is the Levenshtein distance algorithm, with two modifications. First, instead of working on individual characters, the metric may be configured to treat individual words (or tokens—logical groupings of words, e.g., "patent law") as the smallest units of comparison. Secondly the score may be normalized by the sum of the number of words in the context plus the number of words in the headnote description, as shown in FIG. 26. The topic (or key number) of the headnote may be compared to the topics of other headnotes cited in the input brief. A similarity score may be calculated based on the overlap of the topics, as shown in FIG. 27.

The best headnote for a given citation or pincite may be selected by using a linear algorithm to combine one or more metrics into a single score. For example, the algorithm may be configured to take into account the text similarity score of the headnote, the topic similarity score of the headnote, whether the headnote comes from a pincite with page numbers, and/or whether the headnote comes from a pincite whose context includes exact quotes. Combined scores may be used to calculate a single score for the headnote. The pool of candidates may then be ranked by score, and the top-ranking headnote may be selected.

In another example, issues may be identified from input text based on the formatting or content of the input text, apart from any citations in the text. As described above, an input text may be converted to html format if it is not so formatted already. In a first example, issues may be identified based on the structure or formatting (which may indicate aspects of the structure) of the input text or document. For example, all the top level HTML elements may be placed on an element list and the following elements may be extracted from the element list, and placed on a heading list: (a) elements marked with H1 tag, (b) elements marked with P tag, and have font style of "font-weight:bold", and (c) elements inside a P tag and marked with SPAN tag, and meet one of the following requirements: (i) it is the first SPAN element, with font style of "font-weight:bold", and its text length is greater than 8 terms (configurable) or (ii) it is not the first SPAN element, but the text of the elements before it is only white spaces. And its font style is "font-weight:bold" and its text length is greater than 8 terms (which is configurable). In another example, headings may be extracted based on language features. For example, all the top level HTML elements may be placed on an element list and the elements meeting one of the following requirements are extracted from the element list, and are placed on the heading list: (a) if the whole text line (all the words in the element) are in uppercase, (b) if the text line starts with a Roman numeral and dot, e.g. II. Arguments, or (c) if the text line starts with a capital letter and dot, e.g. A. Introduction.

Based on a list of identified headers, candidate issues may be generated by using trigger terms. For example, headings that start with (called StartHeading)) ARGUMENT(S), DISCUSSION(S), LEGAL or PRELIMINARY STATEMENT or headings that start with (called EndHeading)) FOOTNOTE(S) or CONCLUSION(S) may be identified. All the headings between the StartHeading and EndHeading may be placed on the issue candidate list. If the EndHeading is not found, then a pseudo EndHeading may be created, which represents the end of the document. In the heading list, if a heading is before the StartHeading, and it contains a case citation, it may also be added to the issue candidate list. In another example, if no StartHeading is found, then all the headings may be added to the issue candidate list Issues identified from headers may be filtered, metadata may be generated, and issue titles may be normalized. For example, candidates starting with the certain terms may be filtered out form consideration, such as terms like standard(s) of review, preliminary statement, statement of (the/related) case, statement of jurisdiction, statement of fact, statement of the issue, background, federal case, and procedural history. Also, candidates whose text length is less than 400 characters (which is configurable), and do not contain any case citation may be filtered out. Metadata may be generated for the issues. For example, the heading text may be assigned as the issue title, the issue text may be assigned as the text starts from the heading of this issue (included) to the start of next heading (excluded) and may be processed to identify issue paragraphs, and existing citations may be cataloged from the case and statute citations in the issue. Finally, the title of the issue may be normalized if two or more issues have the same title by extracting the first N words of the issue text (after the title text) and appending them to the issue title, to differentiate them.

In another example, issues may be identified based on the content of the input text. This identification may not be necessary if an issue can be identified based on formatting of the input text. Nevertheless, issues may be identified from the content of input text by preprocessing the input text, segmenting the input text into discrete issues and generating metadata for the issues. For example, plain text may extracted from the input HTML document, by a HTML parser. The text structure, such as paragraphs, is kept as how they appear in an HTML page browser. The document text may be tokenized, and stop words may be removed. For each remaining term, its Inverse Document Frequency (IDF) value may be computed. Each paragraph (or sentence, etc.) may considered as a document. And the input document is considered as a paragraph (or sentence, etc.) collection. For each paragraph (or sentence, etc.), the TF-IDF value is computed for each term in this paragraph. TF means term frequency, which is the frequency of a term in this paragraph (or sentence, etc.).

Using a term's TF-IDF value as the weight of the term, and cosine similarity as the paragraph similarity measure, the similarity between any two consecutive paragraphs (i.e. the $n^{th}$ paragraph and the $(n+1)^{th}$ paragraph) in the document may be calculated. The similarity between the $n^{th}$ paragraph and the $(n+2)^{th}$ paragraph is also computed. Two consecutive paragraphs (i.e. the $n^{th}$ and the $(n+1)^{th}$) may be put into one issue, if they meet one of the two following conditions: if their similarity is greater than a threshold TH1, which was obtained from a set of training data or if their similarity is less than TH1, but the similarity between the $n^{th}$ and the $(n+2)^{th}$ paragraphs is greater than a threshold TH2, which is also learned from a set of training documents. In this case, all these three paragraphs belong to the same issue.

Finally, the first sentence of the issue is extracted as issue title, the issue text may be identified as the text of all the paragraphs assigned to this issue, the issue paragraphs may be identified as all the paragraphs assigned to the issue, and existing citations may be identified as the case and statute citations in this issue.

With any identified issue, an important aspect can be the particular jurisdiction that is relevant to the issue. In one example, the jurisdiction for an issue may be identified by identifying the most-cited jurisdiction from among the jurisdictions of the citations included in the input text, issue text or existing citations metadata. Citations to higher courts may be given priority over other citations in determining jurisdiction. If an issue contains an equal number of citations to two different jurisdictions, both jurisdictions may be identified as relevant to the issue. If the issue contains citations to more than two jurisdictions, the issue may be identified as not having a particularly relevant jurisdiction, and recommendations may come from any court and do not need to be prioritized or filtered based on jurisdiction.

Figure 28:
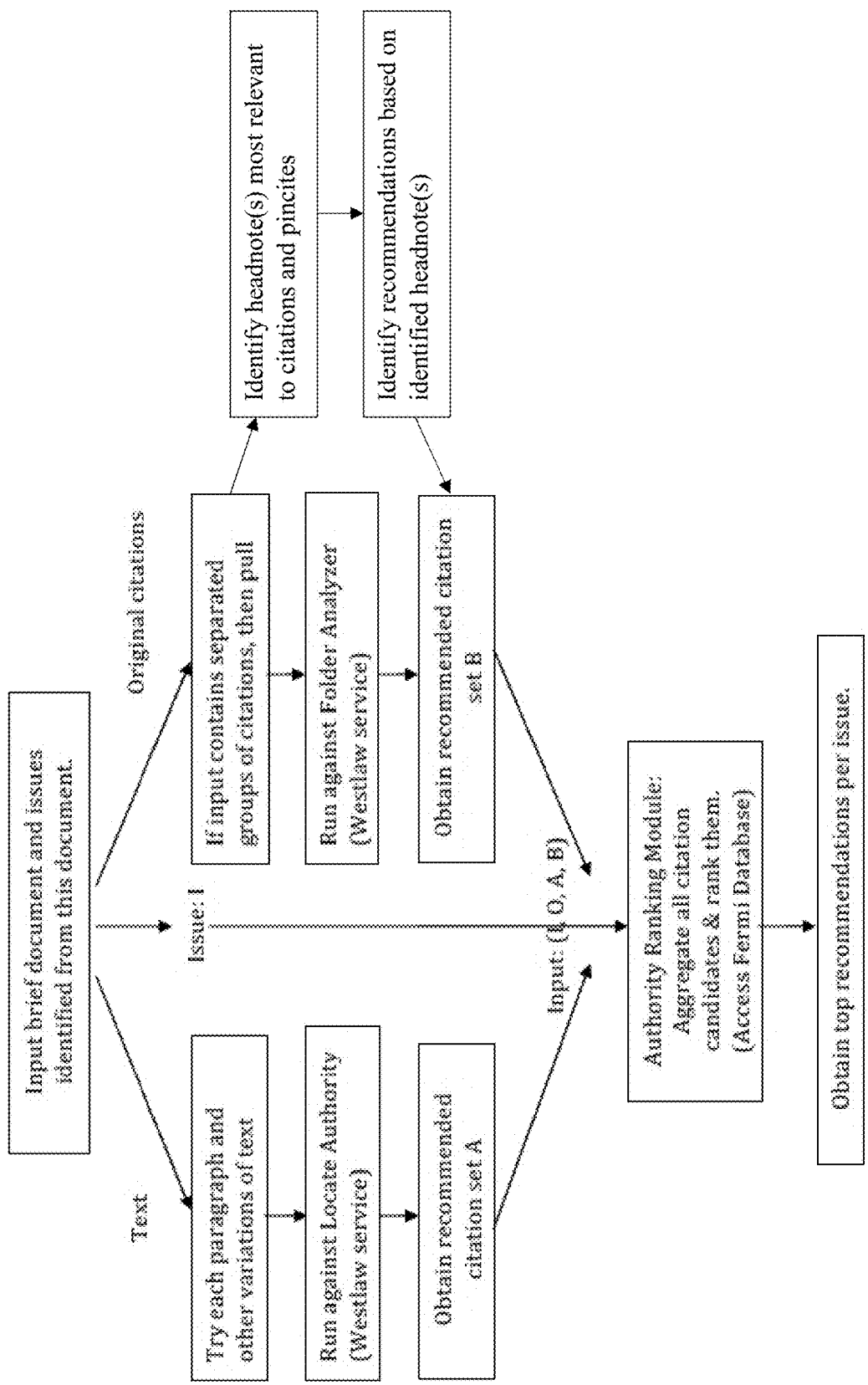
FIG. 28 shows an exemplary recommendation generation and ranking workflow according to an exemplary embodiment.
Figure 29:
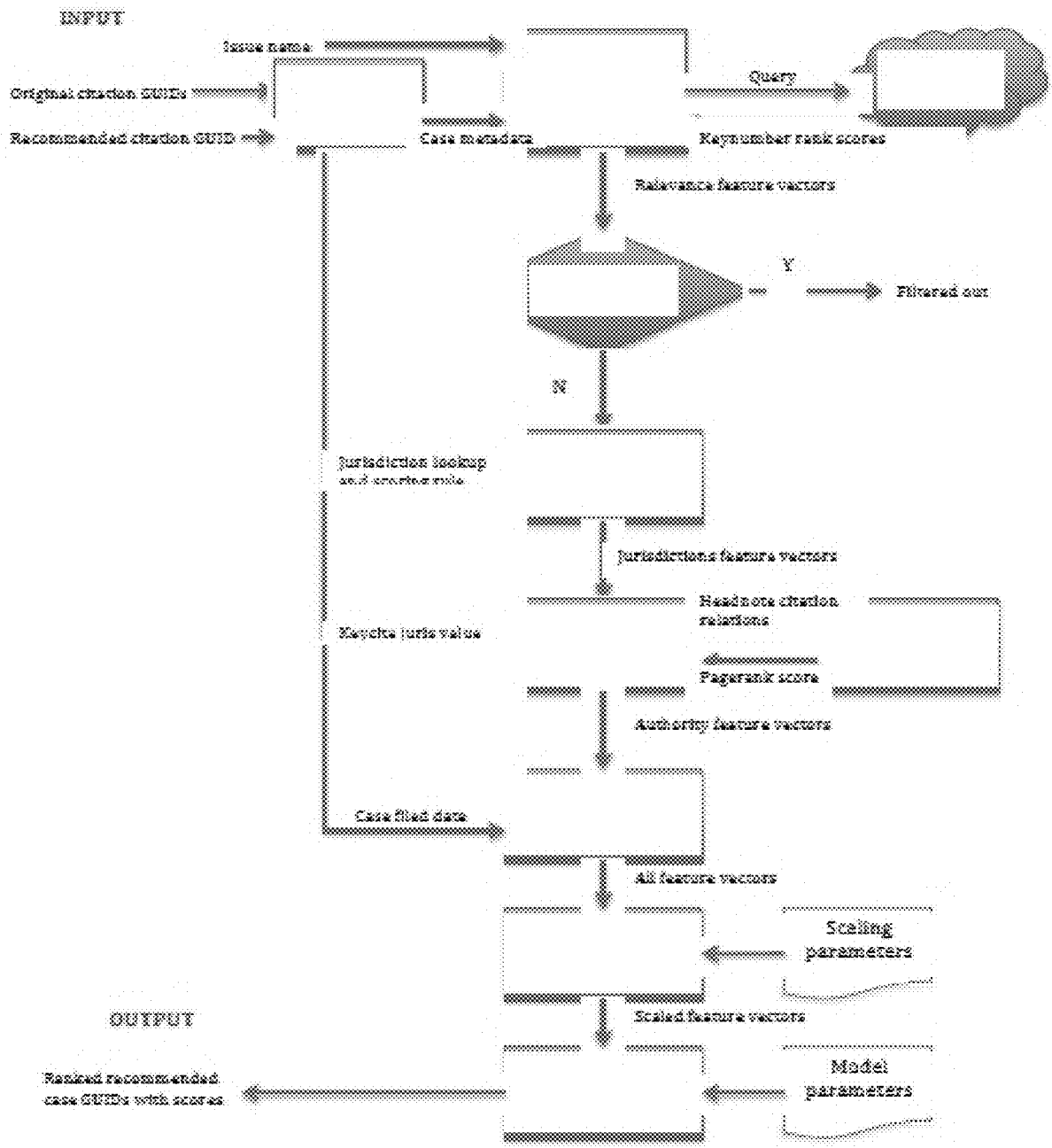
FIG. 29 shows a workflow of an exemplary recommendations ranking module according to an exemplary embodiment.

If there are no citations in an issue the system may be configured to look to the citations in the document as a whole, potentially present in other issue texts, to determine jurisdiction. If there are no citations in the document as a whole, the system may be configured to look to the court that the document is from—usually it will be named in the header or caption of the document. The system may also be configured to look for certain phrases in the document that would indicate the application jurisdiction, e.g. "Under Texas law . . . " or "Texas courts have . . . " If neither of these approaches are possible, then recommendations can come from any court and do not need to be prioritized based on jurisdiction As shown in FIG. 28, recommendations based on any of the avenues described above are obtained and fed to an authority ranking module configured to filter and rank the resulting recommendation candidates. In one example, the ranking module extracts heterogeneous metadata associated with the recommendation candidates, transforms those metadata into feature vectors, feeds a trained learning-to-rank model with those feature vectors, and finally outputs a list of ranked authorities. The learning-to-rank module may be configured to use a linear support vector machine ("SVM") model. An exemplary implementation of a ranking module is shown in FIG. 29.

Given a list of guid-strings of recommended cases, this module may connect to a Fermi database and extract heterogeneous metadata associated with each case document. The main types of metadata may include, for example:

| Metadata | Description |
|---|---|
| Title | the short case title, like XXX vs. YYY |
| filedDate | the date that the case document was filed |
| jurisdicalFlag | the color of the keyCite flag, such as red and yellow |
| courtLevel | the level of court that released the case document |
| fermiJurisCode | the jurisdiction code of the court that released the case document |
| List of all headnote documents | each headnote document includes keyNumber strings, textual content and number of cases that cite the headnote |

The relevance scores deal with the legal opinions or recommendation candidate's similarity to an input issue segment. The relevance scores may be configured to take into account similarity to the issues identified in the input text as well as similarity to citations identified in the input text.

An exemplary issue similarity evaluation may be configured to analyze whether the legal issues discussed in headnotes of a recommended case match the issue segment from input brief. Given an issue segment, several relevance scores may be computed, for example an issue-keyNumber score, issue-topic score and headnote score for each case document. The computation of such scores may involve sending the issue title to KeyNumber Finder (KNF), which may be configured to return a list of relevant KeyNumbers given a query string such as "Motion to Set Aside Default Judgment Good Cause") and extract top 20 relevant keyNumbers with their corresponding rank scores. Given a case document, each headnote may be evaluated and, for each may be recorded its keyNumber, topic (topic is the first half part of keyNumber) and cited count. For example, keyNumber 198Hk402: Health/Public Health/Injury compensation funds may have a topic 198H (Health). An issue-keyNumber score may be computed as the sum of rank scores of all keyNumbers of case headnotes matched with top 20 KNF of an issue title. An issue-topic score may be computed as the sum of frequencies of all topics of case headnotes matched with top 20 KNF of an issue. The headnote score may be computed as the mean of cited counts from those headnotes with keyNumbers found in top 20 KNF of an issue.

An exemplary citation similarity evaluation may be configured to analyze whether the headnotes of a recommended case share the legal points with the headnotes of the original case citations of an input issue segment. Several related scores may be computed, for example a cited-keyNumber score and cited-topic score. The computation of such scores may involve going through each original citation, and then going through each headnote of that citation to record its keyNumber and topic. Such computation may also involve counting the frequency of keyNumbers and topics found in original citations. The cited-keyNumber score may be computed as the sum of frequencies of all keyNumbers of a recommended citation found in original citations. The cited-topic score may be computed as the sum of frequency of all topics of a recommended citation found in original citations.

A pre-filtering process may be applied to the set of recommended citations. For example, a pre-filtering process may be configured to try and remove types of recommended citations that are determined to be not useful and thus should not be shown to the user including, for example, red-flagged cases whose the keyCite flag of the case is red, indicating it is not a good law anymore, cases that are already cited in the input document, and topically irrelevant cases for which the sum of issue-topic score and cited-topic score is zero, indicating that such case document neither shares the legal opinions with already cited case documents, nor contains legal issues related to the current issue title.

A jurisdiction score ranking algorithm may be employed to indicate the closeness of jurisdiction scope of recommended citations to that of a corresponding issue segment from the input document. Each jurisdiction scope may be denoted by a Fermi Jurisdiction Code (FJC), which is further determined by a court line code, contained in each citation. For example, court line code 3805 refers to FJC MN-CS-ALL, i.e. Minnesota State and Federal.

In a first step, a jurisdiction score ranking algorithm may be configured to determine the first priority FJC of the current issue segment. This may involve the procedure discussed above with respect to identifying a jurisdiction most applicable to an issue in an input text. In another example, this may involve identifying the courtline code from each citation in the input segment and looking up all FJCs along with priority values that match to that courtline code. From there, the most frequent FJC from all citations may be selected and designated as the FJC of that issue segment. If there are more than one "most frequent FJC" identified, a jurisdiction priority value may be used to break the tie. In addition to a first priority FJC, a secondary priority FJC may also be determined for an issue segment.

A jurisdiction rank score may be assigned to each recommended citation. For example, if the FJC of a citation is the first priority FJC of the input FJC (i.e. the same FJC as the input FJC), a score of, for example, "6" may be assigned. If the FJC of a citation is the second priority FJC of the input FJC (i.e. the similar FJC within the jurisdiction range of the input FJC), a score of, for example, "2" may be assigned. All other citations may be assigned an "out-of-jurisdiction" score, for example "1".

An authority score may be computed for recommended citations. For example, the authority score in ranking algorithm represents the degree of authoritativeness and recognition of the recommended citations. An authority score may be comprised of any number of constituent scores, for example a court level score and a PageRank authority score. For example, a court level score may be determined by extracting court level value for each recommended case document from Fermi table. A PageRank authority score may be determined from, for example, a citation graph among recommended case documents is built, running a PageRank algorithm on this graph, and taking the final PageRank score of each node as the PageRank authority score assigned to each document.

A recency score may be computed for recommended citations, for example to indicate how recent a recommended case is. We extract the filed date of the case, as the recency score=year+(month)/12. In addition to a recency score, a recommendation-frequency score may also be computed by counting frequency of keyNumbers occurring in all candidate recommendations and, given a case document, the recommendation-frequency score may be computed as the sum of keyNumbers frequencies computed above, from that document's headnotes.

Any of the aforementioned scores can be aggregated and used to compute an aggregated ranking for a recommended citation. For example, the aforementioned scores may be individually weighted or scaled, of example into a 0 to 1 range, and then fed into a linear SVM ranker. The SVM ranking may be configured to contain two phases: training and testing. In the training phase, the coefficients of all types of scaled scores (i.e. features) may be determined by leveraging pair-wise learning-to-rank methods. In the testing phase, the trained SVM ranker is evaluated.

Once the SVM ranker is ready, it may be configured to input rank features of each original and recommended citation of an issue segment, and then output a list ranked original plus recommended citations. A cutoff of the output list may be desirable before presenting the results to the user, since there may be a large number of potential recommendations, for example over 100. A simple threshold rank value or top number of results may be used as a cutoff.

As another option, a dynamic cutoff method may be employed. For example, if there are no original citations existing in the issue segment, we just output top five recommended citations. On the other hand, if there are N original citations (N>0), all recommended citations that are higher than the lowest-ranked original citation in the list may be selected, plus the next N recommended citations. For instance, if there are eight recommended citations and two original citations and four of the eight recommendation citations are ranked higher than at least one original citation, the final selected recommend citations will be 4+2=6, from the total of eight recommend citations. For example, if A, B, C, D represent recommended citations and O1, O2 represent original citations and the ranking of all citations are A, B, C, O1, D, O2, E, F, G, H, then the selected recommended cases will be A, B, C, D, E, F. In some cases, an overall recommendation limit may be implemented, no matter how highly recommendations may be ranked. For example, the system may be configured to only output at most the top 10 recommended citations, no matter how highly any other recommendations may be ranked.

Figure 30:
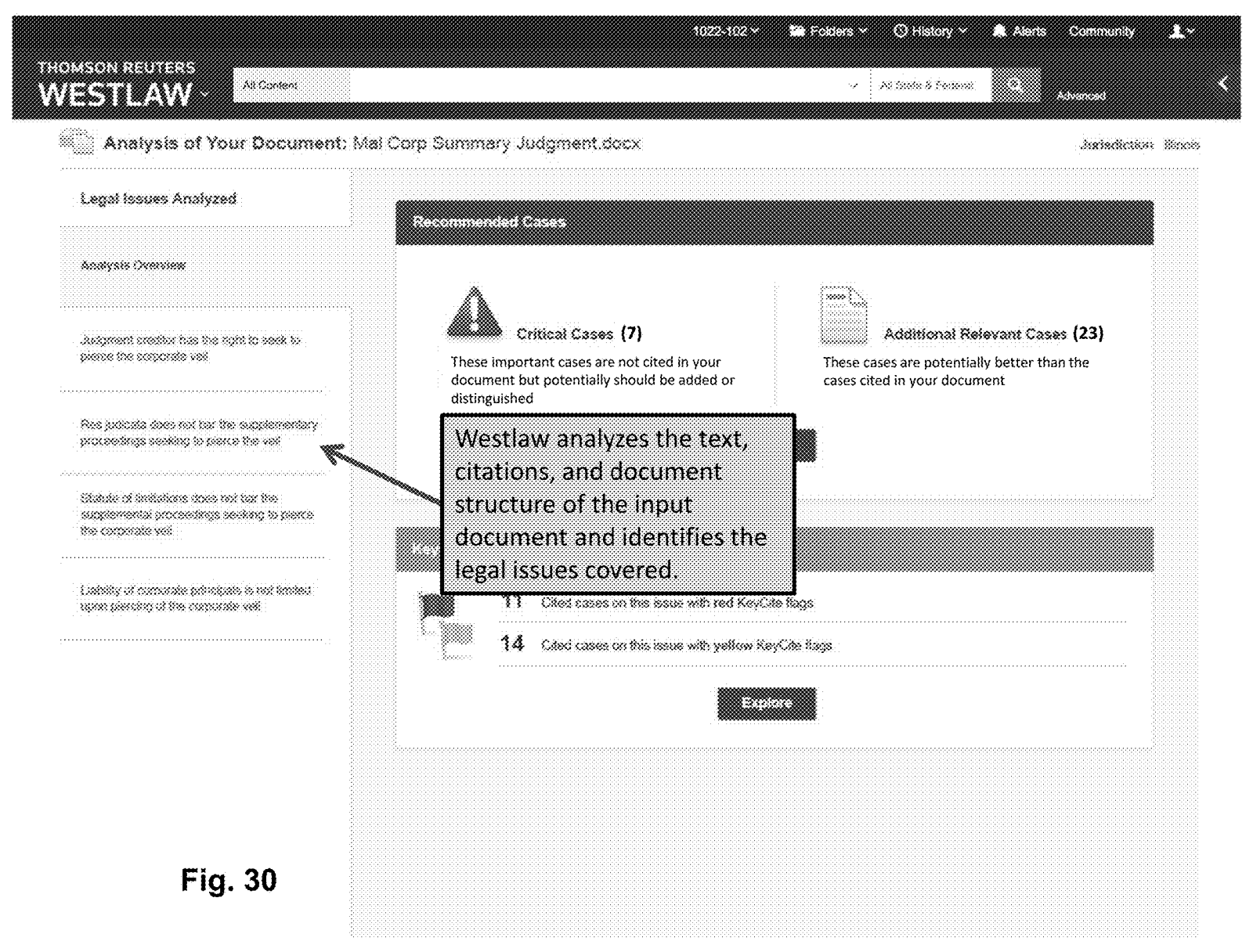

FIG. 30 shows an example of a user interface of the inventive system showing how analyzed input text, citations and document structure of the input document may be displayed to a user.

Figure 31:
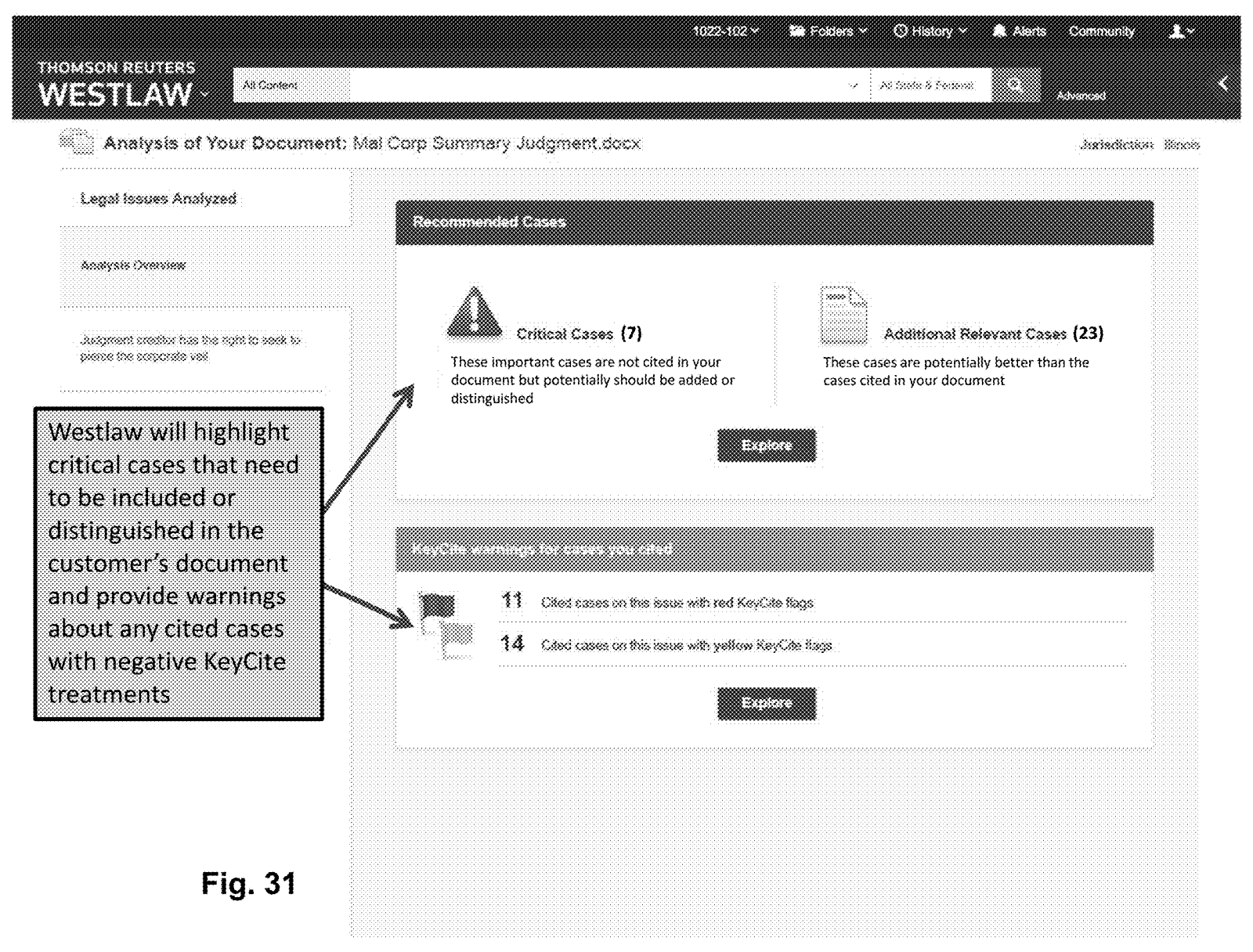

FIG. 31 shows an example of a user interface of the inventive system showing how critical cases may be highlighted for the user to be aware of and if they desire to distinguish those critical cases. The user interface shown in FIG. 31 also demonstrates how warnings about cited cases with negative KeyCite treatments can be displayed by the inventive system to a user.

Figure 32:
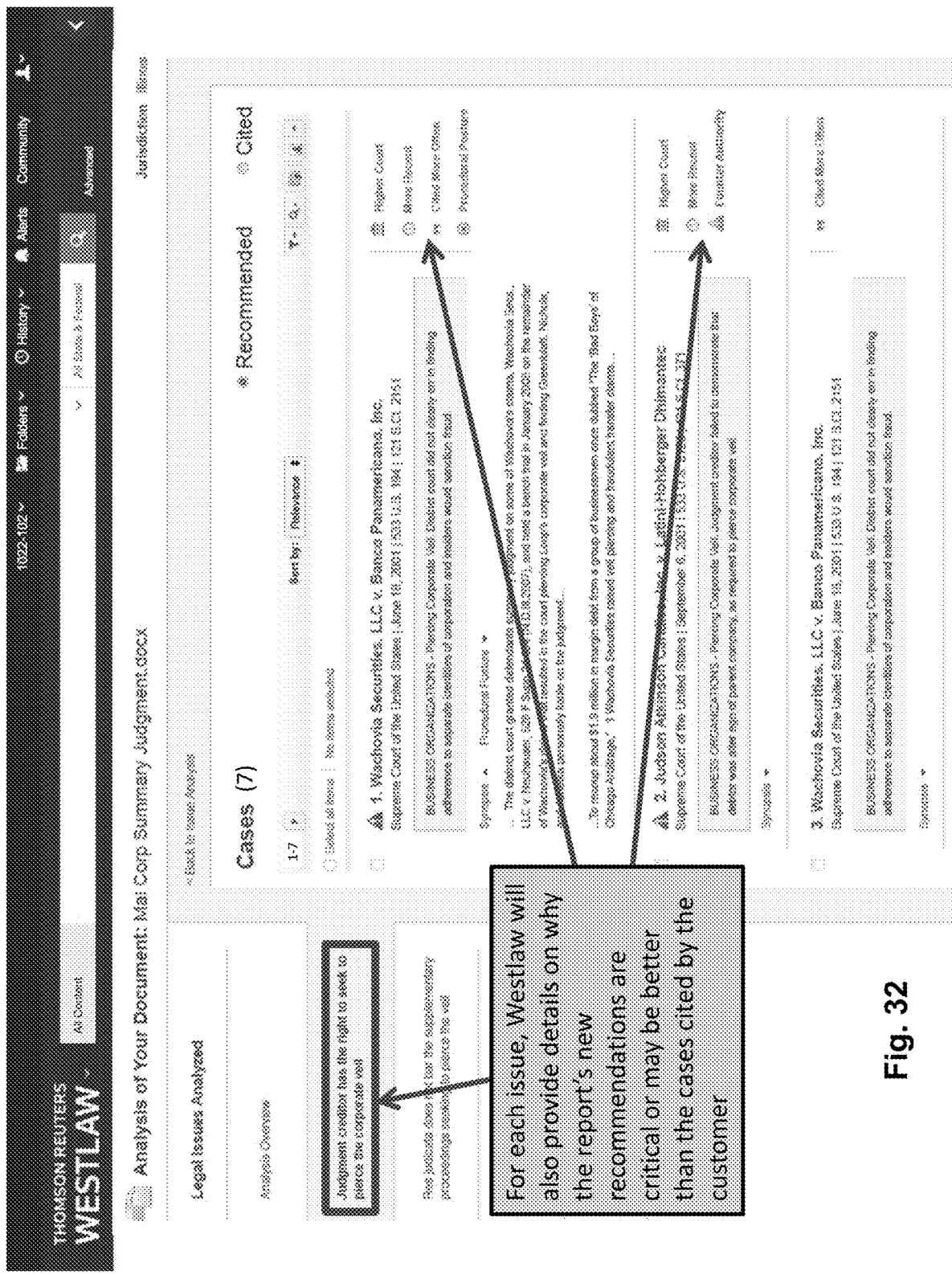
FIG. 32 shows an example of a user interface of the inventive system according to an exemplary embodiment showing how the system may be configured to provide, for each issue, details on why the report's new recommendations are critical or may be better than cases cited by the user.

FIG. 32 shows an example of a user interface of the inventive system showing how the system may be configured to provide, for each issue, details on why the report's new recommendations are critical or may be better than cases cited by the user.

Figure 33:
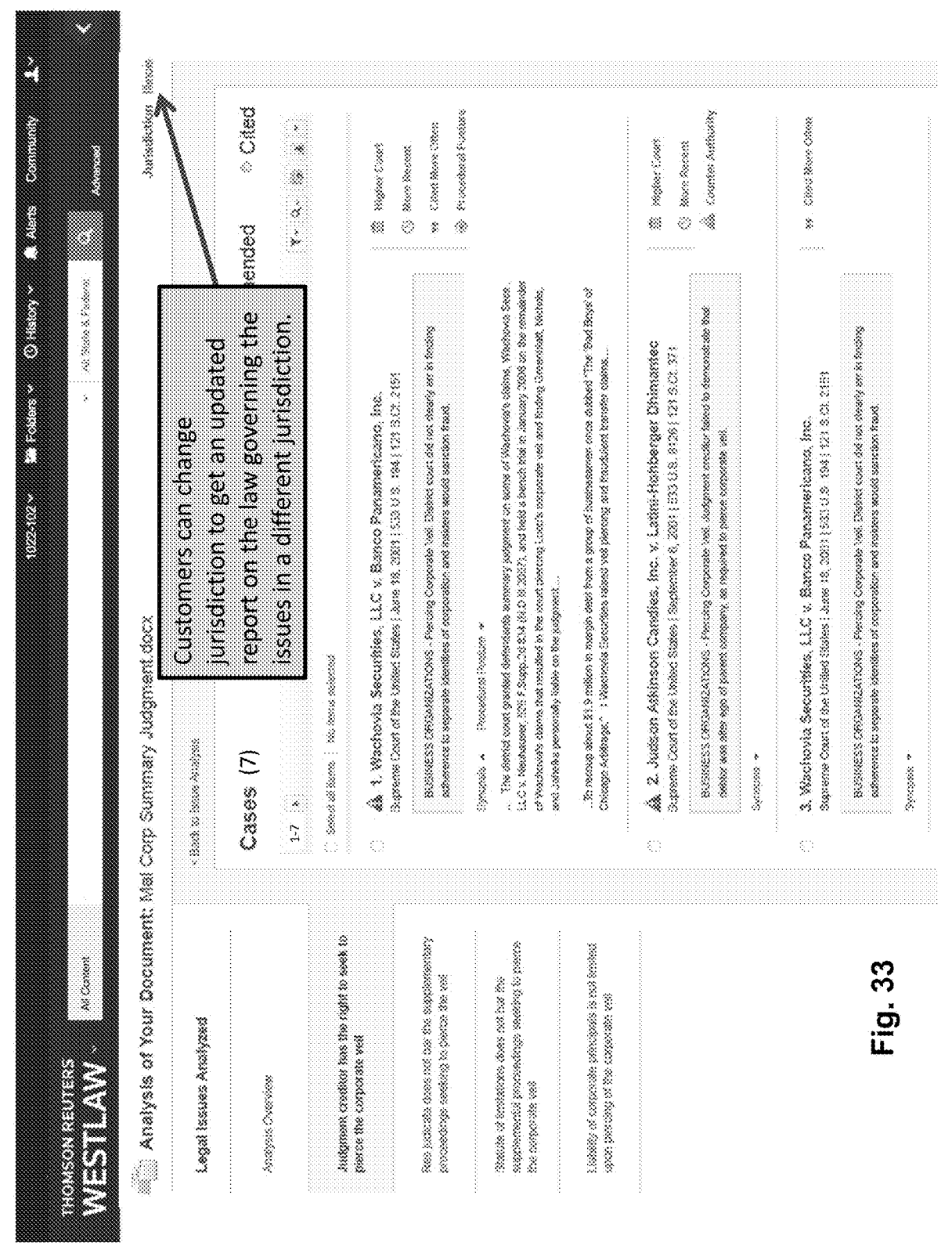

FIG. 33 shows an example of a user interface of the inventive system showing how the system may be configured to permit user input to change the jurisdiction that was determined to be applicable to a given issue.

An Exemplary System i. Research Recommendation System Controller

Figure 5:
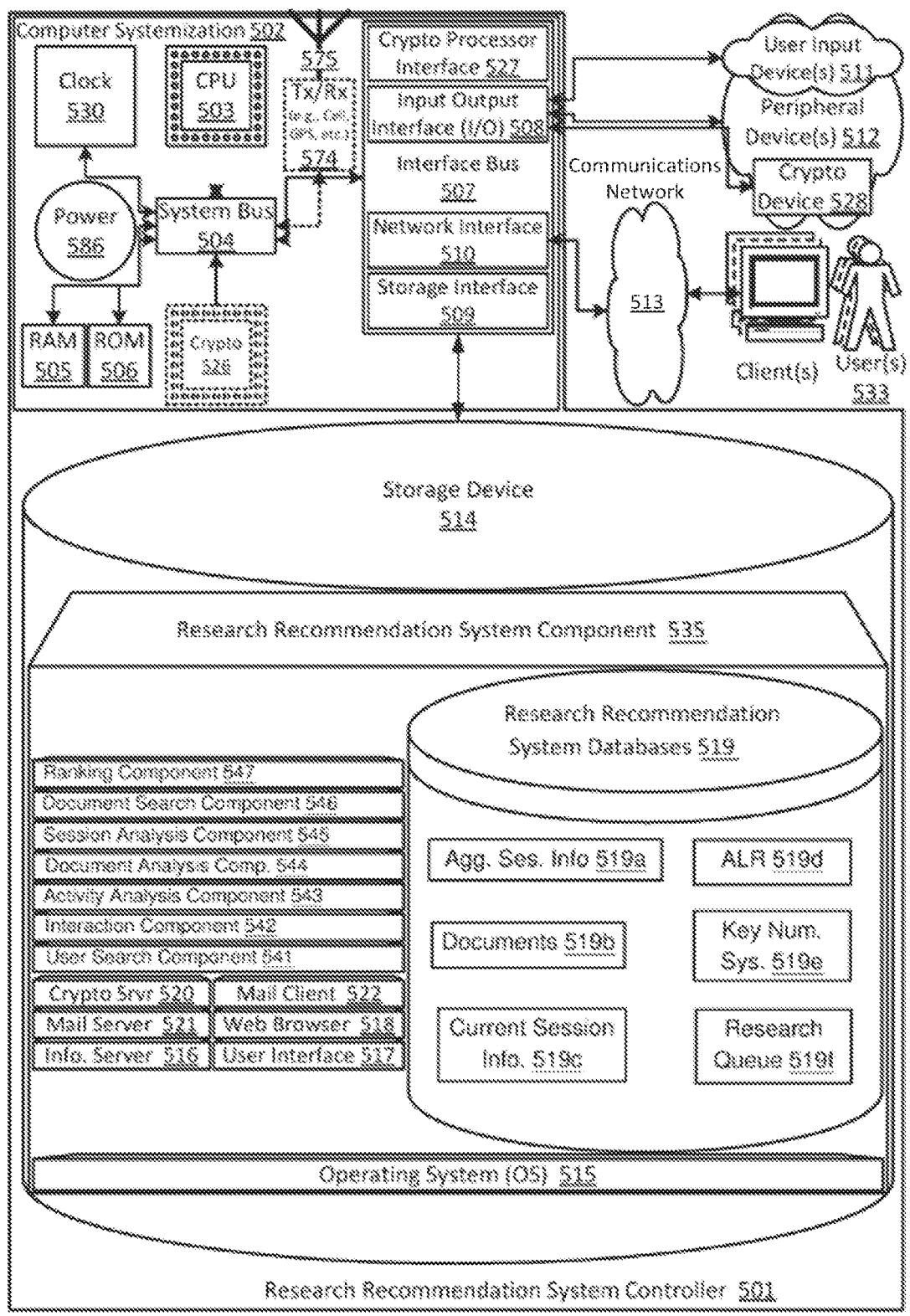
FIG. 5 shows a block diagram illustrating embodiments of a Research Recommendation System controller.

FIG. 5 shows a block diagram illustrating embodiments of a Research Recommendation System controller. In this embodiment, the Research Recommendation System controller 501 may serve to aggregate, process, store, search, serve, identify, instruct, generate, match, and/or facilitate interactions with a computer, and/or other related data.

Typically, users, which may be people and/or other systems, may engage information technology systems (e.g., computers) to facilitate information processing. In turn, computers employ processors to process information; such processors 503 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 529 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the Research Recommendation System controller 501 may be connected to and/or communicate with entities such as, but not limited to: one or more users from user input devices 511; peripheral devices 512; an optional cryptographic processor device 528; and/or a communications network 513.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The Research Recommendation System controller 501 may be based on computer systems that may comprise, but are not limited to, components such as: a computer systemization 502 connected to memory 529.

ii. Computer Systemization

A computer systemization 502 may comprise a clock 530, central processing unit ("CPU(s)" and/or "processor(s)" (these terms are used interchangeably throughout the disclosure unless noted to the contrary)) 503, a memory 529 (e.g., a read only memory (ROM) 506, a random access memory (RAM) 505, etc.), and/or an interface bus 507, and most frequently, although not necessarily, are all interconnected and/or communicating through a system bus 504 on one or more (mother)board(s) 502 having conductive and/or otherwise transportive circuit pathways through which instructions (e.g., binary encoded signals) may travel to effectuate communications, operations, storage, etc. The computer systemization may be connected to a power source 586; e.g., optionally the power source may be internal. Optionally, a cryptographic processor 526 and/or transceivers (e.g., ICs) 574 may be connected to the system bus. In another embodiment, the cryptographic processor and/or transceivers may be connected as either internal and/or external peripheral devices 512 via the interface bus I/O. In turn, the transceivers may be connected to antenna(s) 575, thereby effectuating wireless transmission and reception of various communication and/or sensor protocols; for example the antenna(s) may connect to: a Texas Instruments WiLink WL1283 transceiver chip (e.g., providing 802.11n, Bluetooth 3.0, FM, global positioning system (GPS) (thereby allowing Research Recommendation System controller to determine its location)); Broadcom BCM4329FKUBG transceiver chip (e.g., providing 802.11n, Bluetooth 2.1+EDR, FM, etc.); a Broadcom BCM4750IUB8 receiver chip (e.g., GPS); an Infineon Technologies X-Gold 618-PMB9800 (e.g., providing 2G/3G HSDPA/HSUPA communications); and/or the like. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 529 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the Research Recommendation System controller and beyond through various interfaces. Should processing requirements dictate a greater amount speed and/or capacity, distributed processors (e.g., Distributed Research Recommendation System), mainframe, multi-core, parallel, and/or super-computer architectures may similarly be employed. Alternatively, should deployment requirements dictate greater portability, smaller Personal Digital Assistants (PDAs) may be employed.

Depending on the particular implementation, features of the Research Recommendation System may be achieved by implementing a microcontroller such as CAST's R8051XC2 microcontroller; Intel's MCS 51 (i.e., 8051 microcontroller);

and/or the like. Also, to implement certain features of the Research Recommendation System, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the Research Recommendation System component collection (distributed or otherwise) and/or features may be implemented via the microprocessor and/or via embedded components; e.g., via ASIC, coprocessor, DSP, FPGA, and/or the like. Alternately, some implementations of the Research Recommendation System may be implemented with embedded components that are configured and used to achieve a variety of features or signal processing.

Depending on the particular implementation, the embedded components may include software solutions, hardware solutions, and/or some combination of both hardware/software solutions. For example, Research Recommendation System features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the Research Recommendation System features. A hierarchy of programmable interconnects allow logic blocks to be interconnected as needed by the Research Recommendation System designer/administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. In some circumstances, the Research Recommendation System may be developed on regular FPGAs and then migrated into a fixed version that more resembles ASIC implementations. Alternate or coordinating implementations may migrate Research Recommendation System controller features to a final ASIC instead of or in addition to FPGAs. Depending on the implementation all of the aforementioned embedded components and microprocessors may be considered the "CPU" and/or "processor" for the Research Recommendation System.

iii. Power Source

The power source 586 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 586 is connected to at least one of the interconnected subsequent components of the Research Recommendation System thereby providing an electric current to all subsequent components. In one example, the power source 586 is connected to the system bus component 504. In an alternative embodiment, an outside power source 586 is provided through a connection across the I/O 508 interface. For example, a USB and/or IEEE 1394 connection carries both data and power across the connection and is therefore a suitable source of power.

iv. Interface Adapters

Interface bus(ses) 507 may accept, connect, and/or communicate to a number of interface adapters, conventionally although not necessarily in the form of adapter cards, such as but not limited to: input output interfaces (I/O) 508, storage interfaces 509, network interfaces 510, and/or the like. Optionally, cryptographic processor interfaces 527 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 509 may accept, communicate, and/or connect to a number of storage devices such as, but not limited to: storage devices 514, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 510 may accept, communicate, and/or connect to a communications network 513. Through a communications network 513, the Research Recommendation System controller is accessible through remote clients 533b (e.g., computers with web browsers) by users 533a. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed Research Recommendation System), architectures may similarly be employed to pool, load balance, and/or otherwise increase the communicative bandwidth required by the Research Recommendation System controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 510 may be used to engage with various communications network types 513. For example, multiple network interfaces may be employed to allow for the communication over broadcast, multicast, and/or unicast networks.

Input Output interfaces (I/O) 508 may accept, communicate, and/or connect to user input devices 511, peripheral devices 512, cryptographic processor devices 528, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless transceivers: 802.11a/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices 511 often are a type of peripheral device 512 (see below) and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like.

Peripheral devices 512 may be connected and/or communicate to I/O and/or other facilities of the like such as network interfaces, storage interfaces, directly to the interface bus, system bus, the CPU, and/or the like. Peripheral devices may be external, internal and/or part of the Research Recommendation System controller. Peripheral devices may include: antenna, audio devices (e.g., line-in, line-out, microphone input, speakers, etc.), cameras (e.g., still, video, webcam, etc.), dongles (e.g., for copy protection, ensuring secure transactions with a digital signature, and/or the like), external processors (for added capabilities; e.g., crypto devices 528), force-feedback devices (e.g., vibrating motors), network interfaces, printers, scanners, storage devices, transceivers (e.g., cellular, GPS, etc.), video devices (e.g., goggles, monitors, etc.), video sources, visors, and/or the like. Peripheral devices often include types of input devices (e.g., cameras).

It should be noted that although user input devices and peripheral devices may be employed, the Research Recommendation System controller may be embodied as an embedded, dedicated, and/or monitor-less (i.e., headless) device, wherein access would be provided over a network interface connection.

Cryptographic units such as, but not limited to, microcontrollers, processors 526, interfaces 527, and/or devices 528 may be attached, and/or communicate with the Research Recommendation System controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: Broadcom's CryptoNetX and other Security Processors; nCipher's nShield; SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+MB/s of cryptographic instructions; VLSI Technology's 33 MHz 6868; and/or the like.

v. Memory

Generally, any mechanization and/or embodiment allowing a processor to affect the storage and/or retrieval of information is regarded as memory 529. However, memory is a fungible technology and resource, thus, any number of memory embodiments may be employed in lieu of or in concert with one another. It is to be understood that the Research Recommendation System controller and/or a computer systemization may employ various forms of memory 529. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In a typical configuration, memory 529 will include ROM 506, RAM 505, and a storage device 514. A storage device 514 may be any conventional computer system storage. Storage devices may include a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

vi. Component Collection

The memory 529 may contain a collection of program and/or database components and/or data such as, but not limited to: operating system component(s) 515 (operating system); information server component(s) 516 (information server); user interface component(s) 517 (user interface); Web browser component(s) 518 (Web browser); database(s) 519; mail server component(s) 521; mail client component(s) 522; cryptographic server component(s) 520 (cryptographic server); the Research Recommendation System component(s) 535; the User Search component 541; the Interaction component 542, the Activity Analysis component 543; the Document Analysis component 544; the Session Analysis component 545; the Document Search component 546; the Ranking component 547 and/or the like (i.e., collectively a component collection). These components may be stored and accessed from the storage devices and/or from storage devices accessible through an interface bus. Although non-conventional program components such as those in the component collection, typically, are stored in a local storage device 514, they may also be loaded and/or stored in memory such as: peripheral devices, RAM, remote storage facilities through a communications network, ROM, various forms of memory, and/or the like. Also, while the components are described separately herein, it will be understood that they may be combined and/or subdivided in any compatible manner.

vii. Operating System

The operating system component 515 is an executable program component facilitating the operation of the Research Recommendation System controller. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 10/8/7/2003/2000/98/95/3.1/CE/Millenium/NT/Vista/XP (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the Research Recommendation System controller to communicate with other entities through a communications network 513. Various communication protocols may be used by the Research Recommendation System controller as a subcarrier transport mechanism for interaction, such as, but not limited to: multicast, TCP/IP, UDP, unicast, and/or the like.

viii. Information Server

An information server component 516 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the Research Recommendation System controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the Research Recommendation System databases 519, operating systems, other program components, user interfaces, Web browsers, and/or the like.

Access to the Research Recommendation System database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the Research Recommendation System. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the Research Recommendation System as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

ix. User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millenium/NT/XP/Vista/7 (i.e., Aero), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface, any of which may be used and) provide a baseline and means of accessing and displaying information graphically to users.

A user interface component 517 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

x. Web Browser

A Web browser component 518 is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the Research Recommendation System enabled nodes. The combined application may be nugatory on systems employing standard Web browsers.

xi. Mail Server

A mail server component 521 is a stored program component that is executed by a CPU 503. The mail server may be a conventional Internet mail server such as, but not limited to sendmail, Microsoft Exchange, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the Research Recommendation System. Mail may also take the form of messages sent from one Research Recommendation System user to another that is not in the form of traditional email but is more akin to direct messaging or the like conventionally enabled by social networks.

Access to the Research Recommendation System mail may be achieved through a number of APIs offered by the individual Web server components and/or the operating system.

Also, a mail server may contain, communicate, generate, obtain, and/or provide program component, system, user, and/or data communications, requests, information, and/or responses.

xii. Mail Client

A mail client component 522 is a stored program component that is executed by a CPU 503. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

xiii. Cryptographic Server

A cryptographic server component 520 is a stored program component that is executed by a CPU 503, cryptographic processor 526, cryptographic processor interface 527, cryptographic processor device 528, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the Research Recommendation System may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for a digital audio file. A cryptographic component may communicate to and/or with other components in a component collection, including itself, and/or facilities of the like. The cryptographic component supports encryption schemes allowing for the secure transmission of information across a communications network to enable the Research Recommendation System component to engage in secure transactions if so desired. The cryptographic component facilitates the secure accessing of resources on the Research Recommendation System and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

xiv. The Research Recommendation System Databases

The Research Recommendation System databases component 519 may be embodied in one database and its stored data, may be embodied in two or more distinct databases and their stored data, or may be partially or wholly embodied in an unstructured manner. For the purposes of simplicity of description, discussion of the Research Recommendation System databases component 519 herein may refer to such component in the singular tense, however this is not to be considered as limiting the Research Recommendation System databases to an embodiment in which they reside in a single database. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the Research Recommendation System database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the Research Recommendation System database is implemented as a data-structure, the use of the Research Recommendation System database 519 may be integrated into another component such as the Research Recommendation System component 535. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 519 may include several included databases or tables 519a-f, examples of which are described above.

In one embodiment, the Research Recommendation System database 519 may interact with other database systems. For example, employing a distributed database system, queries and data access by a search Research Recommendation System component may treat the combination of the Research Recommendation System databases 519, an integrated data security layer database as a single database entity.

In one embodiment, user programs may contain various user interface primitives, which may serve to update the Research Recommendation System. Also, various accounts may require custom database tables depending upon the environments and the types of clients the Research Recommendation System may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 519a-f. The Research Recommendation System may be configured to keep track of various settings, inputs, and parameters via database controllers.

The Research Recommendation System database may communicate to and/or with other components in a component collection, including itself, and/or facilities of the like. Most frequently, the Research Recommendation System database communicates with the Research Recommendation System component, other program components, and/or the like. The database may contain, retain, and provide information regarding other nodes and data.

xv. The Research Recommendation Systems

The Research Recommendation System component 535 is a stored program component that is executed by a CPU. In one embodiment, the Research Recommendation System component incorporates any and/or all combinations of the aspects of the Research Recommendation System that was discussed in the previous figures. As such, the Research Recommendation System affects accessing, obtaining and the provision of information, services, transactions, and/or the like across various communications networks. The features and embodiments of the Research Recommendation System discussed herein increase network efficiency by reducing data transfer requirements the use of more efficient data structures and mechanisms for their transfer and storage. As a consequence, more data may be transferred in less time, and latencies with regard to transactions, are also reduced. In many cases, such reduction in storage, transfer time, bandwidth requirements, latencies, etc., will reduce the capacity and structural infrastructure requirements to support the Research Recommendation System's features and facilities, and in many cases reduce the costs, energy consumption/requirements, and extend the life of Research Recommendation System's underlying infrastructure; this has the added benefit of making the Research Recommendation System more reliable. Similarly, many of the features and mechanisms are designed to be easier for users to use and access, thereby broadening the audience that may enjoy/employ and exploit the feature sets of the Research Recommendation System; such ease of use also helps to increase the reliability of the Research Recommendation System. In addition, the feature sets include heightened security as noted via the Cryptographic components 520, 526, 528 and throughout, making access to the features and data more reliable and secure.

The Research Recommendation System component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the Research Recommendation System server employs a cryptographic server to encrypt and decrypt communications. The Research Recommendation System component may communicate to and/or with other components in a component collection, including itself, and/or facilities of the like. Most frequently, the Research Recommendation System component communicates with the Research Recommendation System database, operating systems, other program components, and/or the like. The Research Recommendation System may contain, communicate, generate, obtain, and/or provide program component, system, user, and/or data communications, requests, and/or responses.

xvi. Distributed Research Recommendation Systems

The structure and/or operation of any of the Research Recommendation System node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the Research Recommendation System controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the Research Recommendation System controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

```
<?PHP
header('Content-Type: text/plain');
// set ip address and port to listen to for incoming data
$address = '192.168.0.100';
$port = 255;
// create a server-side SSL socket, listen for/accept incoming
communication
$sock = socket_create(AF_INET, SOCK_STREAM, 0);
socket_bind($sock, $address, $port) or die('Could not bind to address');
socket_listen($sock);
$client = socket_accept($sock);
// read input data from client device in 1024 byte blocks until end of
message
do {
  $input = "";
  $input = socket_read($client, 1024);
  $data .= $input;
} while($input != "");
// parse data to extract variables
$obj = json_decode($data, true);
// store input data in a database
mysql_connect("201.408.185.132",$DBserver,$password); // access
database server
mysql_select("CLIENT_DB.SQL"); // select database to append
mysql_query("INSERT INTO UserTable (transmission)
```

-continued

```
VALUES ($data)"); // add data to UserTable table in a CLIENT database
mysql_close("CLIENT_DB.SQL"); // close connection to database
?>
```

Also, the following resources may be used to provide example embodiments regarding SOAP parser implementation:

http://www.xav.com/perl/site/lib/SOAP/Parser.html
http://publib.boulder.ibm.com/Infocenter/tivihelp/v2r1/index.jsp?topic=/com.ibm.IBMDI.doc/referenceguide295.htm and other parser implementations:

http://publib.boulder.ibm.com/infocenter/tivihelp/v2r1/index.jsp?topic=/com.ibm.IBMDI.doc/referenceguide259.htm all of which are hereby expressly incorporated by reference.

A. CONCLUSION

FIGS. 1 through 23 are conceptual illustrations allowing for an explanation of the present disclosure. It should be understood that various aspects of the embodiments of the present disclosure could be implemented in hardware, firmware, software, or combinations thereof. In such embodiments, the various components and/or steps would be implemented in hardware, firmware, and/or software to perform the functions of the present disclosure. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the disclosure as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; or the like.

Notably, the figures and examples above are not meant to limit the scope of the present disclosure to a single embodiment, as other embodiments are possible by way of interchange of some or all of the described or illustrated elements. Moreover, where certain elements of the present disclosure can be partially or fully implemented using known components, only those portions of such known components that are necessary for an understanding of the present disclosure are described, and detailed descriptions of other portions of such known components are omitted so as not to obscure the disclosure. In the present specification, an embodiment showing a singular component should not necessarily be limited to other embodiments including a plurality of the same component, and vice-versa, unless explicitly stated otherwise herein. Moreover, the applicants do not intend for any term in the specification or claims to be ascribed an uncommon or special meaning unless explicitly set forth as such. Further, the present disclosure encompasses present and future known equivalents to the known components referred to herein by way of illustration.

The foregoing description of the specific embodiments so fully reveals the general nature of the disclosure that others can, by applying knowledge within the skill of the relevant art(s), readily modify and/or adapt for various applications such specific embodiments, without undue experimentation, without departing from the general concept of the present disclosure. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

In order to address various issues and advance the art, the entirety of this application for LEGAL RESEARCH RECOMMENDATION SYSTEM (including the Cover Page, Title, Headings, Cross-Reference to Related Application, Background, Brief Summary, Brief Description of the Drawings, Detailed Description, Claims, Figures, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of an individual and/or enterprise user, database configuration and/or relational model, data type, data transmission and/or network framework, syntax structure, and/or the like, various embodiments may be implemented that enable a great deal of flexibility and customization. For example, aspects may be adapted for video, audio or any other content. While various embodiments and discussions have included reference to applications in the legal industry, it is to be understood that the embodiments described herein may be readily configured and/or customized for a wide variety of other applications and/or implementations.

What is claimed is:

1. A method for improving a computerized search system's research recommendations, embodied as instructions stored in non-transitory computer memory of the computerized search system which, when executed by a computer processor, are configured to:

receive, using an application programming interface (API), a first binary encoded signal associated with an input text provided by a user computing device;

parse the input text to identify one or more conceptual issue topics relevant thereto, including at least identifying any cites to other documents contained in the input text and identifying conceptual issue topics in the input text based on any conceptual issue topics known to be relevant to the identified cited documents;

identify recommendation candidates known to be relevant to the one or more identified conceptual issue topics; and transmit, using the API, a second binary encoded signal to the user computing device, the second binary encoded signal being configured to render results of the identifying step via a user interface of the user computing device, the results comprising the recommendation candidates ranked according to a respective relevancy score indicating how relevant each recommendation candidate is to the input text, wherein the relevancy score is based on a weighted aggregation of at least (i) a legal jurisdiction score, (ii) an authority score, and (iii) a recency score, and (iv) a recommendation-frequency score, wherein the legal jurisdiction score indicates a closeness of legal jurisdiction scope between the recommendation candidate and the input text based on a comparison between a first legal jurisdiction code associated with the recommendation candidate and a second legal jurisdiction code associated with the input text, wherein the authority score indicates a degree of authoritativeness of the recommendation candidate with respect to one or more other recommendation candidates, wherein the recency score indicates a recentness of the recommendation candidates determined based on document metadata extracted from an electronic record database, and wherein the recommendation-frequency score indicates a degree of similarity between headnotes relevant to the input text and headnotes identified in data included in respective headnote portions of the recommendation candidates.

2. The method of claim 1, wherein the parsing step includes identifying conceptual issue topics based one or more formatting aspects of the input text.

3. The method of claim 1, wherein the parsing step includes identifying any pincites to locations within other documents in the input text and identifying conceptual issue topics in the input text based on any issues known to be relevant to the identified pincited locations.

4. The method of claim 3, further comprising, if more than one conceptual issue topic is known to be relevant to an identified pincited location, determining which known conceptual issue topic is most relevant to the input text based on the context of the pincite in the input text.

5. The method of claim 4, wherein the context includes a text of any blockquote relevant to the pincite in the input text.

6. The method of claim 4, wherein the context includes the portion of the input text from the pincite to the previous pincite or the beginning of the input text, whichever is nearer to the pincite.

7. The method of claim 4, further comprising identifying one or more legal jurisdictions relevant to the input text and the context of a pincite includes the identified one or more legal jurisdictions.

8. The method of claim 1, wherein the relevancy score is based at least in part on a similarity between each recommendation candidate and the input text.

9. The method of claim 1, wherein the relevancy score is based at least in part on a similarity between each recommendation candidate and documents cited in the input text.

10. The method of claim 9, wherein the similarity between each recommendation candidate and documents cited in the input text is determined at least in part by comparing a similarity between conceptual issue topics known to be relevant to each recommendation candidate and conceptual issue topics known to be relevant to the documents cited in the input text.

11. The method of claim 1, further comprising pre-filtering the results of the identifying step before returning them by only passing results having a higher relevancy score than a document cited in the input texts having a lowest relevancy score of all documents cited in the input text.

12. The method of claim 11, wherein the pre-filtering step is configured to also pass a predetermined number of results having a lower relevancy score than the document cited in the input texts having the lowest relevancy score of all documents cited in the input text.

13. The method of claim 1, wherein the weighted aggregation is determined by an SVM model.

14. The method of claim 1, wherein the parsing step includes converting the input text to HTML format if it is not already in HTML format, executing an HTML parser to extract plain text from the HTML, formatted input text, segmenting the plain text into discrete issues and generating metadata for each of the discrete issues.

15. The method of claim 1, wherein the determining the degree of similarity between headnotes relevant to the input text and headnotes identified in recommendation candidates on which the recommendation-frequency score is based includes, for each headnote present in a recommendation candidate, determining frequency that a particular headnote is included in the input text and documents cited by the input text relative to all other included headnotes, and summing such frequencies for all headnotes identified in the recommendation candidate.

16. The method of claim 1, wherein the relevancy score is further based on an issue similarity score that indicates similarity between respective conceptual issue topics of the recommendation candidate and the input text.

17. The method of claim 1, wherein the relevancy score is further based on an issue similarity scores, wherein the issue similarity score indicates similarity between respective conceptual issue topics of the recommendation candidate and the input text.

18. The method of claim 1, further comprising determining the authority score based on two or more authority scores associated with the recommendation candidate.

19. The method of claim 1, further comprising determining the authority score based on one or more metadata values stored in a data structure associated with the recommendation candidate.

20. The method of claim 1, further comprising determining the authority score based on a graph data structure that represents relationships among the recommendation candidates.

* * * * *

UNITED STATES PATENT AND TRADEMARK OFFICE
CERTIFICATE OF CORRECTION

PATENT NO. : 12,002,122 B2
APPLICATION NO. : 15/934917
DATED : June 4, 2024
INVENTOR(S) : Liu et al.

Page 1 of 1

It is certified that error appears in the above-identified patent and that said Letters Patent is hereby corrected as shown below:

In the Claims

<u>Column 38,</u>
Line 53, "score, and" should read --score,--.
<u>Column 40,</u>
Line 11, "HTML, formatted" should read --HTML formatted--.

Signed and Sealed this
Twenty-eighth Day of January, 2025

Coke Morgan Stewart
*Acting Director of the United States Patent and Trademark Office*